United States Patent
Swensen et al.

(10) Patent No.: US 11,505,464 B2
(45) Date of Patent: Nov. 22, 2022

(54) THERMAL FRACTURE AND MICROCARBON SEPARATION OF COAL PARTICLES

(71) Applicant: Omnis Advanced Technologies, LLC., Santa Barbara, CA (US)

(72) Inventors: James S. Swensen, Santa Barbara, CA (US); Douglas E. Grunder, Mt. Vernon, IA (US); Simon K. Hodson, Santa Barbara, CA (US)

(73) Assignee: OMNIS ADVANCED TECHNOLOGIES, LLC, Santa Barbara, CA (US)

( * ) Notice: Subject to any disclaimer, the term of this patent is extended or adjusted under 35 U.S.C. 154(b) by 268 days.

(21) Appl. No.: 16/795,345

(22) Filed: Feb. 19, 2020

(65) Prior Publication Data
US 2020/0262704 A1 Aug. 20, 2020

Related U.S. Application Data

(60) Provisional application No. 62/807,655, filed on Feb. 19, 2019.

(51) Int. Cl.
*C01B 31/02* (2006.01)
*C01B 32/05* (2017.01)
*C10B 49/04* (2006.01)
*B02C 19/18* (2006.01)
*C10B 53/00* (2006.01)

(52) U.S. Cl.
CPC ............ *C01B 32/05* (2017.08); *B02C 19/186* (2013.01); *C10B 49/04* (2013.01); *C10B 53/00* (2013.01); *C01P 2004/03* (2013.01); *C01P 2006/40* (2013.01)

(58) Field of Classification Search
CPC ..................................................... C01B 32/05
See application file for complete search history.

(56) References Cited

U.S. PATENT DOCUMENTS

| 4,358,344 | A | * | 11/1982 | Sass | ........................ | C10G 1/006 201/22 |
|---|---|---|---|---|---|---|
| 4,366,045 | A | | 12/1982 | Swanson | | |
| 2015/0166917 | A1 | | 6/2015 | Ponce De Leon et al. | | |
| 2015/0184099 | A1 | | 7/2015 | Swensen et al. | | |
| 2018/0195018 | A1 | | 7/2018 | Swensen et al. | | |

FOREIGN PATENT DOCUMENTS

EP 3388497 A1 10/2018

OTHER PUBLICATIONS

Craig N. Eatough et al., Devolatilization of large coal particles at high pressure, Elsevier Science Ltd., Fuel vol. 75, No. 13, pp. 1601-1605, 1996, Great Britain.

Alfred G. Duba, Electrical conductivity of coal and coal char, Fuel, 1977, vol. 56, 441-443.

P.J. Dacombe et al., Fragmentation of large coal particles in a drop-tube furnace, Fuel, 1994, vol. 73, No. 8, 1365-1367.

* cited by examiner

*Primary Examiner* — Stuart L Hendrickson
(74) *Attorney, Agent, or Firm* — Kirton McConkie; Evan R. Witt

(57) ABSTRACT

A process for fracturing and devolatilizing coal particles rapidly exposes coal particles to a high temperature, oxygen-depleted work zone for a sufficient time period to cause volatile matter within the coal particles to vaporize and fracture the coal particles. The work zone has a temperature in the range from 600° C. to 2000° C. The coal particles are exposed to the high temperature, oxygen-depleted work zone for a time period less than 1 seconds, and preferably less than 0.3 second. The vaporized volatile matter is condensed and recovered as microcarbon particles.

14 Claims, 17 Drawing Sheets

THERMAL FRACTURE AND MICROCARBON SEPARATION OF COAL PARTICLES

CROSS-REFERENCE TO RELATED APPLICATION

This application claims the benefit of U.S. Provisional Application No. 62/807,655, filed Feb. 19, 2019, and entitled THERMAL FRACTURE AND MICROCARBON SEPARATION OF COAL PARTICLES. This prior application is incorporated by reference.

BACKGROUND OF THE INVENTION

This disclosure relates to rapid thermal fracturing of coal particles. The rapid thermal fracturing also enables a separation of larger particles and smaller particles, including nano-size and molecular-size particles. The resulting coal particles have a substantially reduced average particle size and particle fractions having significantly different carbon (or carbonaceous) and mineral properties.

Traditional coal comminution is done by physical means through various attrition methods. Coal is milled for different end uses, for example pulverized coal injection into coal fired power plants or as an additive to a coking process.

Coal is a natural composite material consisting of carbonaceous matter, entrained mineral matter, and some surface bound and microstructure bound water. Upon combustion of coal, ash is formed from the entrained mineral matter. The "ash" content of coal refers to the content of entrained mineral matter in the coal deposit. The carbonaceous matter is broken down into two further categories: fixed carbon and volatile matter. Volatile matter ranges from less than 10% by mass for anthracite up to 35% by mass for bituminous coal and as high as 55% by mass or so for sub-bituminous and lignite coals. The balance of the carbonaceous mass percent is considered to be fixed carbon.

Simply stated, the amount of volatile matter in coal is determined by heating the coal particles to 950° C. in a quartz container with a lid on it and held at 950° C. for 7 minutes. The loss in mass is the percent volatile matter by mass. (D3175-11—Standard Test Method for Volatile Matter in the Analysis Sample of Coal and Coke.) The bulk of the volatile matter is coal tar. Coal tar includes macromolecules that have a low enough molecular weight to vaporize at the process temperature rather than remain as a solid. The lid ensures the coal particles are heated under pyrolytic conditions (absence of oxygen). If oxygen were present at the high temperature, the coal particles would burn and be converted to $CO_2$.

When heated in the absence of oxygen, e.g. pyrolysis, low molecular weight organic molecules and coal tar starts to enter into the vapor phase at about 200° C. to 250° C. Mass loss above 700° C. is usually attributed to carbonization where the coal is becoming pure carbon, losing oxygen, hydrogen, sulfur, and nitrogen, as well as any volatile minor elemental constituents that were bound up within the carbonaceous matrix.

Molecules entering the vapor phase may have existed as discrete molecules in the carbonaceous matrix. Destructive distillation may occur at just about any temperature, in particular as temperatures exceed 350° C. Destructive distillation is a process by which bond breaking occurs to split a larger macromolecule into smaller molecules. These smaller molecules can then enter into the vapor phase. Destructive distillation is usually done in the absence of oxygen. It is a way to break down or "crack" large macromolecules. The organic molecules that enter the vapor phase are generally called "coal tar". Coal tar is complicated mixture of polycyclic aromatic hydrocarbons, phenols, and heterocyclic, nitrogen, sulfur, and oxygen compounds. Most coal tar is likely produced via destructive distillation.

Conventional methods of coal particle size reduction include ball milling, hammer mill, roller mill, etc. All these methods result in particles of the same size or reduced size that have the same chemical composition, specifically carbon, nitrogen, oxygen, sulfur, hydrogen, and volatile matter. None of these methods uses heat to reduce particle size, and none of the methods separate particles by chemical composition or carbon type. There is currently no effective way to reduce solid particle size and separate carbon type using heat.

There are two traditional methods for high temperature processing of coal. The first process is to burn it for its energy. All four major grades of coal (lignite, sub-bituminous, bituminous, and anthracite) are or can be burned. The burning efficiency is reduced with larger particles size and increased impurities, specifically water, sulfur, nitrogen, oxygen, and mineral matter. Reduction in particles size and removal of impurities improves the burning efficiency and reduces harmful emissions. The second is to heat it in a coking furnace. Conventional heating processes take minutes or hours and do not result in reduced particle size. Generally, there is a softening of the particles followed by a fusion step to produce long range coke structure. The coking process results in a solid coal-derived material, e.g. coke, with the a uniform chemical composition that is different from the original coal chemical composition. Coal with the "right" properties are used to make coke. Such coals are called metallurgical grade coal. These coals are in the mid to high volatile matter range of bituminous coal and are blended together to make coke. Generally, lignite, sub-bituminous coal, and anthracite cannot be used to make coke or are used as a very small amount of the coal blend used to make coke.

In a coking furnace, the coal is heated rather slowly. At around 350° C. to 450° C., the coal softens to form a plastic layer which slowly proceeds throughout the bulk and becomes a very viscous fluid that is often called "softened coal". In the temperature range between 400° C. and 500° C., coal tar vapor is separated from the softened coal. As the vapor escapes the softened coal, vacancies, pores, and structure are left behind in the bulk of the softened coal. Around 450° C. to 550° C., the softened coal fuses into a solid structure and then begins to carbonize at higher temperature.

The softening that occurs during the coking process is not an exact melting event and occurs over minutes or usually hours. The following happens during the softening process: low molecular weight material vaporizes; medium molecular weight material becomes a viscous mass; and large molecular weight material undergoes destructive distillation and gives off low molecular weight vapor and medium molecular weight material that combines with the viscous mass. In the softened stage, destructive distillation continues from about 475° C. to 600° C., resulting in the evolution of tar and aromatic hydrocarbons. Destructive distillation continues in the melt, causing more material to enter the vapor phase, leaving behind voids and pores in the softened viscous mass. At 600° C. the softened viscous mass begins to transitions to a solid via a fusion process that occurs throughout the melt. "The exact mechanism of coal fusion is not completely understood." (The Chemistry and Technology of Coal p. 224, 2$^{nd}$ Edition). In the solid phase, further destructive distillation occurs, and then carbonization proceeds. There is still a large amount of volatile matter in the fused coal at this point. Destructive distillation continues as temperature goes from 600° C. to 1100° C., resulting in further loss in mass consisting of evolved gasses more than just coal tar. Around 1000° C., hydrogen evolves from the high molecular weight and complex solid to finalize the carbonization process. The carbonization is complete when all or most of the hydrogen has been driven off leaving a coke consisting almost completely of carbon.

The remaining solid is commonly called coke. Coke is a porous solid material consisting mainly of carbon. One of the main uses of coke is in the production of iron or steel from iron ore.

In order to optimize the beneficiation of hydrocarbons in coal, the industry has worked for more than a hundred years on processes to convert coal to liquid hydrocarbon and coal to gas hydrocarbon. These processes are inefficient and costly. The typical efficiency of converting coal to liquids is on the order of 30% to 35%. The typical efficiency of converting coal to gas is 50% efficiency. In contrast, the typical efficiency of converting coal to solids using the processes disclosed herein is 75% to 90%. In other words, starting with 100 tons of dry coal feedstock, coal to liquid processes may yield up with 30 tons to 35 tons of liquid. Coal to gas processes may yield up with 50 tons of gas. While coal to solids as disclosed herein may yield from 75 to 90 tons of solids.

There is a need in the art for a process for converting coal to useful solids. Processes to convert coal to solids are set forth in this disclosure.

An advantage of converting coal to liquid and coal to gas is that they are beneficiation processes for the removal of impurities. There is a need in the art for an efficient coal-to-solid beneficiating process for the removal of impurities.

Producing a solid product allows for all the advantages of solids handling and solids transport.

SUMMARY OF THE INVENTION

This disclosure relates to rapid or instantaneous thermal fracturing of coal as a new way to rapidly reduce coal particles size. The process can also separate volatile matter from coal particles without substantially reducing the total carbon mass in the volatile matter. It can also reduce or eliminate impurities, including, but not limited to, sulfur, nitrogen, phosphorous, etc. In the thermal fracture process, an enclosed work zone with an oxygen depleted gas is heated to approximately 1000° C. or a range from about 600° C. to 2000° C., preferably in the range of 600° C. to 1500° C. A work zone temperature from about 400° C. to 600° C. is useful for rapid production of coal. A work zone temperature from about 600° C. to 800° C. for producing microcarbon particles with high oxygen content that are non-conductive. A work zone temperature from about 1000° C. to 2000° C. is useful for production of microcarbon particles that are conductive and that resemble carbon black.

At temperatures greater than 1000° C., the commercial industry converts a substantial portion of the mass to liquids and/or gases. The disclosed process conserves the majority of the carbon mass as a solid. This has advantages for transportation and handling. The products produced in this new process are novel and of significant value.

Coal particles are pneumatically conveyed through this high temperature zone. The coal particles that are fed into the process can be less than 10 mm in size. In another instance, the coal particles that are fed into the process can be less than 6 mm in size. In another instance, the coal particles that are fed into the process were between 0.3 mm and 1 mm. In another instance, the coal particles that are fed into the process can be less than 0.5 mm in size. In another instance, the coal particles that are fed into the process can be less than 0.2 mm in size.

Retention time of the coal particles within the high temperature zone is usually less than 1 second, and often less than 0.02 seconds, and at times less than 0.3 seconds, and sometimes less than 0.1 seconds. The instantaneous thermal shock on the individual coal particles causes organic molecules having different molecular weights and vaporization temperatures to expand rapidly causing a de-stabilization and fracturing of the original coal particles into smaller sizes.

The resulting fractured coal-derived particles have an average particle size less than 200 μm. In some non-limiting embodiments, the average particle size is less than 100 μm. The average size of the fractured and low volatile matter particles is usually between 40 μm and 100 μm.

The disclosed process may produce coal-derived microcarbon particles with a diameter less than 1 mm. The disclosed process may produce coal-derived microcarbon particles with a diameter less than 0.5 mm. The disclosed process may produce coal-derived microcarbon particles with a diameter less than 0.2 mm.

The disclosed process may produce coal-derived microcarbon particles with volatile matter less than 10% by weight. The disclosed process may produce coal-derived microcarbon particles with volatile matter less than 3% by weight.

The disclosed process may produce coal-derived microcarbon particles with a carbon content greater than 90% by weight. The disclosed process may produce coal-derived microcarbon particles with a carbon content greater than 95% by weight.

The disclosed process may produce coal-derived microcarbon particles with a sulfur content less than 1% by weight. The disclosed process may produce coal-derived microcarbon particles with a sulfur content less than 0.5% by weight.

The disclosed process may produce coal-derived microcarbon particles with a nitrogen content less than 1.5% by weight. The disclosed process may produce coal-derived microcarbon particles with a nitrogen content less than 1% by weight. The disclosed process may produce coal-derived microcarbon particles with a nitrogen content less than 0.7% by weight. The disclosed process may produce coal-derived microcarbon particles with a nitrogen content less than 0.5% by weight.

The disclosed process may produce coal-derived microcarbon particles with an ash content less 1% by weight. The disclosed process may produce coal-derived microcarbon particles with an ash content less 0.5% by weight. The disclosed process may produce coal-derived microcarbon particles with an ash content less 0.1% by weight.

The disclosed process may produce coal-derived microcarbon particles that are electrically conductive.

The disclosed process may produce coal-derived microcarbon particles that have a diameter less than 1 mm, volatile matter less than 10% by weight, carbon content greater than 90% by weight, sulfur less than 1% by weight, and nitrogen less than 1% weight, and ash content less 1% by weight.

The disclosed process may produce coal-derived low volatile matter and fractured particles with a porous surface with a diameter that is 5 times or more smaller than the original coal particles, volatile matter less than 10% by weight, carbon content greater than 90% by weight, sulfur less than 1% by weight, and nitrogen less than 1.5% by weight.

The disclosed process may produce a blend of coal-derived microcarbon particles and coal-derived low volatile matter and fractured particles. The coal-derived microcarbon particles and coal-derived low volatile matter and fractured particles may have a volatile matter content less than 10% by weight. The coal-derived microcarbon particles and coal-derived low volatile matter and fractured particles may have a carbon content greater than 90% by weight. The coal-derived microcarbon particles and coal-derived low volatile matter and fractured particles may have a sulfur content less than 1% by weight. The coal-derived microcarbon particles and coal-derived low volatile matter and fractured particles may have a nitrogen content less than 1.5% by weight.

The disclosed process may produce a blend of coal-derived microcarbon particles and coal-derived low volatile matter and fractured particles, with greater than 5% coal-derived microcarbon particles. The disclosed process may produce a blend of coal-derived microcarbon particles and coal-derived low volatile matter and fractured particles, with greater than 5% low volatile matter and fractured particles.

The disclosed process may include an enclosed work zone with an oxygen-depleted atmosphere having an oxygen content less than 5% by weight. The disclosed process may include an enclosed work zone with an oxygen-depleted atmosphere having an oxygen content less than 1% by weight. The disclosed process may include an enclosed work zone with an oxygen-depleted atmosphere having an oxygen content less than 0.5% by weight.

The disclosed process may include a work zone having a temperature greater than 1000° C. The disclosed process may include a work zone having a temperature greater than 1200° C. The disclosed process may include a work zone having a temperature greater than 1400° C. The disclosed process may include a work zone having a temperature greater than 1600° C.

The disclosed process may include a work zone and the coal particles have a residence time in the work zone less than 2 seconds. The disclosed process may include a work zone and the coal particles have a residence time in the work zone less than 1 second.

The disclosed process may form low volatile matter and fractured particles and microcarbon particles simultaneously in the same high temperature work zone.

The disclosed process may include an enclosed work zone with an oxygen-depleted atmosphere having an oxygen content less than 5% by weight, a temperature greater than 1000° C., a coal particle residence time in the work zone less than 2 seconds, resulting in simultaneous formation of low volatile matter and fractured particles and microcarbon particles at the same time in the same high temperature work zone.

In one aspect of the disclosed process, unprocessed coal particles having a given sulfur content are processed in an oxygen depleted gas at a temperature greater than 1200° C. to produce a coal-derived material having a sulfur content that is less than 50% of the sulfur content of the unprocessed coal.

In one aspect of the disclosed process, unprocessed coal particles having a sulfur content greater than 1.5% by weight are processed in an oxygen depleted gas at a temperature greater than 1200° C. to produce a coal-derived material having a sulfur content that is less than 0.8% by weight.

In one aspect of the disclosed process, unprocessed coal particles having a sulfur content greater than 1% by weight are processed in an oxygen depleted gas at a temperature greater than 1200° C. to produce a coal-derived material having a sulfur content that is less than 0.5% by weight.

In one aspect of the disclosed process, unprocessed coal particles having a given volatile matter content are processed in an oxygen depleted gas at a temperature greater than 1200° C. to produce a coal-derived material having a volatile matter content that is less than 5% by weight.

In one aspect of the disclosed process, unprocessed coal particles having a given particle size are processed in an oxygen depleted gas at a temperature greater than 1200° C. for less than 1 second to produce a coal-derived material having an average particle size that is less than 50% of the particle size of the unprocessed coal particles.

The disclosed process also includes further processing of the vaporized volatile matter. This includes different techniques for condensing or agglomerating the vaporized volatile matter. The disclosed process also includes formation and recovery of carbon and microcarbon.

It is to be understood that both the foregoing general description and the following detailed description are exemplary and explanatory and are not restrictive of the invention, as claimed. It is understood that specific aspects and features of the disclosed invention may be freely combined with other specific aspects and features of the disclosed invention. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION OF THE INVENTION

Figure 1:
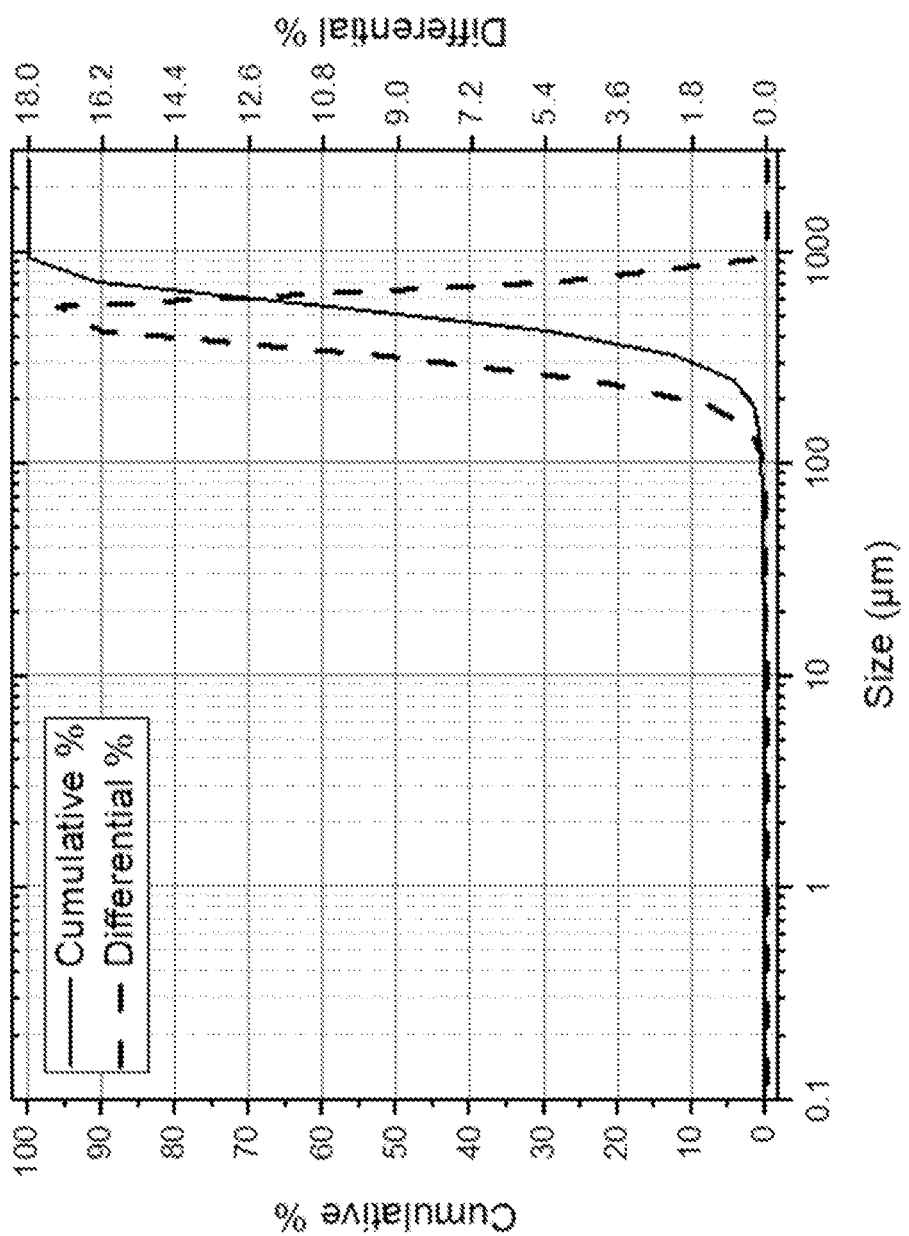
FIG. 1 shows a graph of particle size analysis for feed material coal particles.

This disclosure relates to rapid thermal fracturing of preferably dry coal particles and the formation of microcarbon particles. The moisture is usually less than 5 wt. %. Preferably the moisture content is less than 2%. Most preferably, the moisture approaches 0%. The rapid thermal fracturing also enables a separation of larger particles and smaller particles, including nano-size and molecular-size particles. The resulting coal-derived particles have a substantially reduced average particle size and particle fractions having significantly different carbon (or carbonaceous) and mineral properties.

As stated above, the volatile matter in coal typically ranges from less than 10% by mass up to about 55% by mass across the different coal ranks. The volatile matter is uniformly distributed throughout the coal particles as evidenced by fine coal particles (less than 100 μm) and large coal rocks from the same source having the same volatile matter content. As disclosed herein, when the volatile matter or coal tar that is dispersed evenly throughout the coal particle flash vaporizes, the coal particle shatters or fractures into multiple pieces. The resulting particles include the fixed carbon (free of coal tar) portion of the carbonaceous matter of coal.

Dry Coal particles are pneumatically fed into a high temperature and oxygen depleted work zone. The coal particles are less than 5% moisture, less than 2% moisture, preferably less than 1% moisture. Oxygen is typically less than 1.5%, preferably less than 1%, and even more preferably less than 0.5%. The residence time in the work zone is less than 5 seconds. In some non-limiting embodiments, the residence time in the work zone is less than 1 second, and often less than 0.4 seconds. Often the residence time is less than 0.2 seconds. The coal particles are heated almost instantly to a temperature greater than about 400° C. causing low molecular weight coal tar to vaporize instantaneously. As the coal tar expands rapidly, the coal particle breaks or fractures into smaller pieces, with an average size less than 200 μm in diameter. In some cases, the average size of the fractured coal-derived particles is less than 100 μm in diameter.

These smaller particles are called low volatile matter and fractured particles. The low volatile matter and fractured particles exit the high temperature work zone via pneumatic conveyance and enter into a cyclone. The low volatile matter and fractured particles are collected from the underflow of the cyclone. The standard method for measuring volatile matter for coal shows them to have less than 10% volatile matter, usually about 8%. The low volatile matter and fractured particles are different from the feed coal in size, and volatile matter, and may differ in carbon (C), hydrogen (H), nitrogen (N), sulfur (S), and oxygen (O) content depending on the temperature of the work zone. In fact, the volatile matter that remains consists largely of H, N, S, and O in the carbonaceous matrix that would be driven off during high temperature carbonization as well as some organic compound that are lost due to continuing destructive distillation, most likely methane ethane, propane, or butane.

The coal tar vapor exits the top of the cyclone with the high temperature oxygen depleted gas stream.

When flash devolatization and thermal fracture of the coal particles occurs at lower temperatures, between about 400° C. and 800° C., the coal tar vapor can be condensed into a viscous liquid state after exiting the cyclone. This coal tar can then be used in processes and products that use coal tar. When flash devolatization and thermal fracture of the coal particles occurs at higher temperatures, greater than 600° C., more preferably above 850° C., even more preferably above 1000° C., even more preferably above 1200° C., the organic hydrocarbon gasses (methane, ethane, propane, butane, etc.) that may be present and the larger polycyclic organic molecules called coal tar vapor that may be present undergo further destructive distillation and carbonization in the vapor phase. The product of this process are agglomerates of graphite layers that form spheres on the order of 10 to 500 nm in diameter. The spheres can also be connected together to form long range structure. The connection can be chemical or intra-particle forces such as surface energy minimization or van der Waals forces.

Example 1

Sieve analysis was done on the coal particle feed material. Particle size analysis was also done on the material. More than 99% of the mass of the material was greater than 0.355 mm. The material is mixed for a short period 5 seconds with a handheld high-speed mixer in the presence of a non-ionic surfactant to ensure all the particles are separated. Particle size analysis was conducted using a laser diffraction particle size analyzer. The particles have a peak particle size at about 0.5 mm. The average is 0.51 mm with a d97 of 0.795 mm. d97 means that 97% of the particles have a diameter smaller than the size given. The sieve analysis results are reported in Table 1 and the results from the particle size analyzer are shown in FIG. 1.

TABLE 1

| Retained on Sieve (mm) | Mass Sieve + Material (g) | Mass Sieve (g) | Mass Material (g) | wt. % |
|---|---|---|---|---|
| 1.180 | 419.16 | 416.04 | 3.12 | 1.48 |
| 1.000 | 418.08 | 395.40 | 22.68 | 10.77 |
| 0.600 | 504.40 | 386.81 | 117.59 | 55.84 |
| 0.500 | 410.04 | 366.48 | 43.56 | 20.68 |
| 0.355 | 371.61 | 349.43 | 22.18 | 10.53 |
| 0.250 | 338.62 | 337.87 | 0.75 | 0.36 |
| 0.075 | 314.32 | 313.74 | 0.58 | 0.28 |
| Pass | 365.37 | 365.24 | 0.13 | 0.06 |
| | | Total | 210.59 | 100.00 |

Example 2

Figure 2:
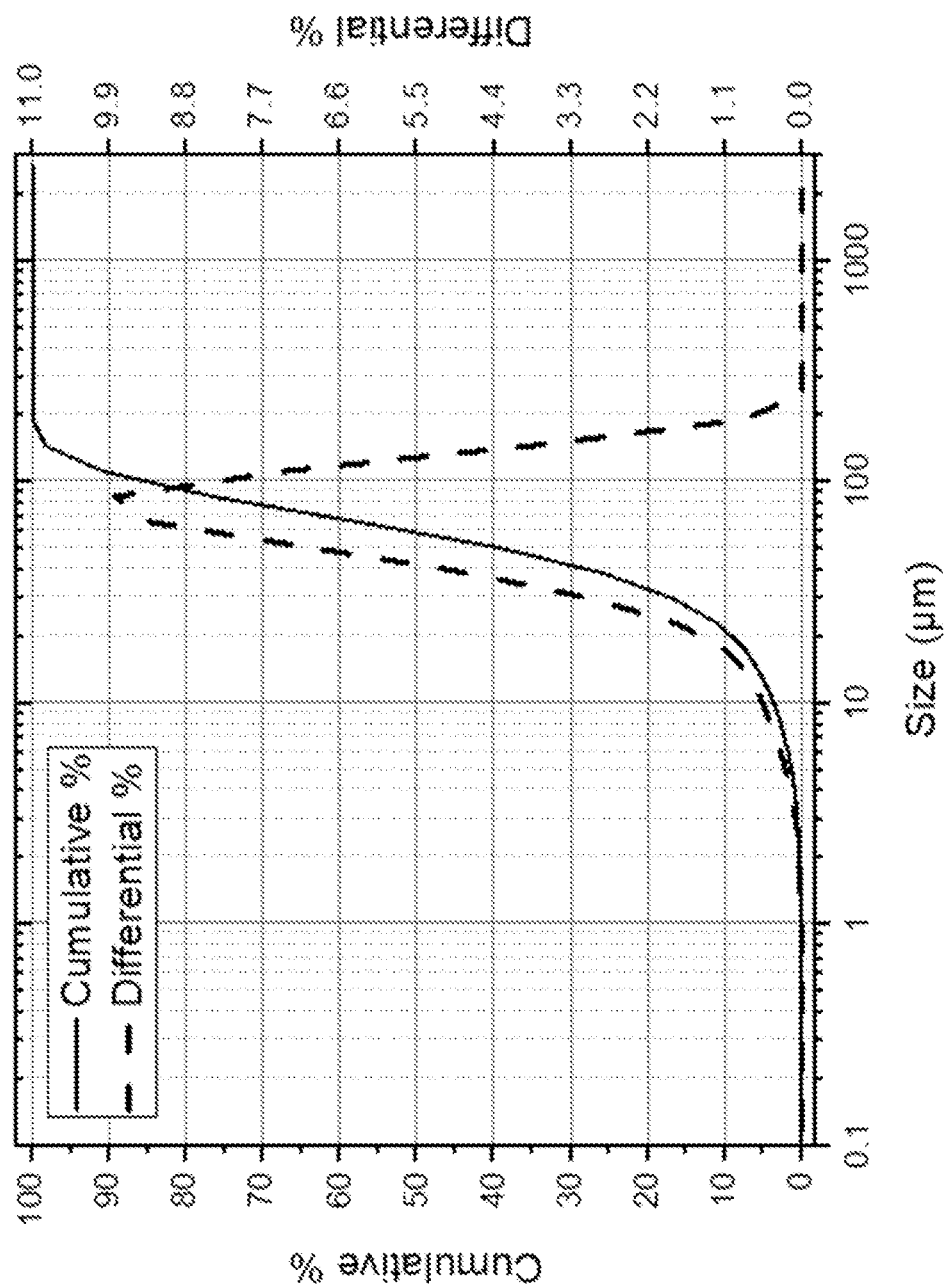
FIG. 2 shows a graph of particle size analysis for the thermal fractured coal-derived particles according to the disclosed process.

Sieve analysis was done on the low volatile matter and fractured particles. About 70% of the mass of the material was less than 0.5 mm. In order to get a better understanding of the fractured particle size, particle size analysis was also done on the material using a laser diffraction particle size analyzer. The material was mixed for 10 second with a high-speed hand mixer in the presence of a non-ionic surfactant to ensure all the particles are separated. The particles have a peak particle size at about 0.06 mm. The average is 0.058 mm with a d97 of 0.135 mm. The sieve analysis results are reported in Table 2 and the results from the particle size analyzer are shown in FIG. 2.

The individual particles produced via thermal fracture conditions are smaller than the feed particle to the thermal fracture process. The average particle size diameter for the thermal fracture particles was reduced by nearly a factor of 10 in this example.

TABLE 2

| Retained on Sieve (mm) | Mass Sieve + Material (g) | Mass Sieve (g) | Mass Material (g) | wt. % |
| --- | --- | --- | --- | --- |
| 1.180 | 417.66 | 416.04 | 1.62 | 1.84 |
| 1.000 | 398.71 | 395.40 | 3.31 | 3.77 |
| 0.600 | 402.06 | 386.81 | 15.25 | 17.37 |
| 0.500 | 372.92 | 366.48 | 6.44 | 7.33 |
| 0.355 | 361.78 | 349.43 | 12.35 | 14.06 |
| 0.250 | 349.67 | 337.87 | 11.80 | 13.44 |
| 0.075 | 339.13 | 313.74 | 25.39 | 28.91 |
| Pass | 376.89 | 365.24 | 11.65 | 13.27 |
| | | Total | 87.81 | 100.00 |

Example 3

The volatile matter of the feed coal particles was measured to be about 33.7%. The feedstock was Pittsburgh 8 coal. Pittsburgh 8 coal is a high volatile matter metallurgical grade coal, meaning in the coking process, it will soften, swell during coal tar evolution, and then fuse together to form the porous long range coke structure.

After the Pittsburgh 8 coal is used as the feedstock in the rapid thermal fracture and microcarbon separation process described above, the volatile matter of the fractured coal-derived particles ranged between 6% and 9% by mass using a work zone temperature of 1000° C. and a retention time in the work zone of 0.6 seconds.

It is believed that the coal feed particles heat up so quickly in the rapid thermal fracture process described herein that the fractured solid particles produced in the process do not pass through a softening stage and fusion step as in the case in the much slower coking process. The fractured particles that remain are solid. The rapid heating event causes instantaneous vaporization of the organic gasses and coal tar via both vaporization and destructive distillation and vaporization.

Stated otherwise, it is believed that the coal particles do not enter a melt stage from which much of the coal tar and organic gasses evolve as in the coking process. The rapid heating causes instantaneous vaporization of existing coal tar molecules and destructive distillation and vaporization of organic gasses and coal tar molecules from the solid particles. The rapid vaporization fractures the coal particles as the organic gases and coal tar vapor evolve. This event is called instantaneous or immediate vaporization and fracture because it can happen in less than 2 seconds, in less than 1 second, in less than 0.4 seconds, and in less than 0.2 seconds.

It is believed that the solid particles that remain, called low volatile matter and fractured particles herein, did not soften as in the coking process because they were heated through this temperature range so quickly. Instead, it is believed that they preceded directly to the fusion stage that is often described in the coking process. If the particles remain in the high temperature work zone for longer periods of time, destructive distillation can continue to remove organic gasses and coal tars to the gas and vapor phase from the solid particle mass. Carbonization at temperatures above about 850° C., more preferably above 1000° C. and even more preferably above 1200° C., will liberate H, N, S, and O from the carbonaceous matrix. If carbonized long enough, these particles will reach a high carbon content. The carbon content can exceed 90% on an ash free basis.

Example 4

The volatile matter can be recovered and utilized in different ways. One possible use for the volatile matter would be to condense it and sell it into the existing organic gasses and coal tar market. A second would be to direct the volatile matter towards a combustor and burn it for heat. A third possible use for the volatile matter would be to further process it through distillation, cracking, coal to gas, coal to liquid, or other similar downstream processing.

Example 5

Another way to utilize the organic gases and coal tar vapor is to convert it directly to microcarbon particles similar in nature to carbon black from the vapor phase. When rapid thermal fracture of the coal particles occurs at higher temperatures, greater than about 800° C., the coal tar vapor carbonizes in the vapor phase. When a carbonized coal vapor reaches a sufficiently large size, it exits the vapor phase as solid particles, called microcarbon particles in this disclosure.

A similar material to microcarbon particles is carbon black. Microcarbon particles are not produced in the same manner in which carbon black is traditionally produced. Carbon black production is described by partial combustion and thermal decomposition of the feedstock (propane, acetylene, petroleum oils, coal oils, coal tars, etc.) in a hot oxygen depleted gas stream. In the case of the thermal fracture and microcarbon particle production, a coal feedstock is injected directly into an oxygen deprived, high temperature gas stream where the gas stream is less than 1% oxygen, preferably less than 0.5% oxygen, even more preferably less than 0.1% oxygen.

One method of producing a high temperature and oxygen deprived gas is the combustion gas exiting a pulse combustor or pulse jet engine. The pulse combustor can use propane, natural gas, fine coal particles less than 50 microns in diameter or some mixture thereof as the fuel. Another method is a standard combustor using propane or natural gas. Another method is a standard combustor for pulverized coal. Another method is flowing oxygen deprived gas over heating elements and/or heat exchangers that are heated by electricity or burning solid, liquid, or gaseous fuel.

Under these conditions, the feedstock coal particles begin to undergo pyrolysis immediately upon injection into the hot and oxygen deprived gas stream. There is negligible partial combustion of the coal particles or emanating organic gasses and coal tar vapor because there is no oxygen. Instead, pyrolysis happens immediately in the hot and oxygen depleted gas stream. As already described, the organic gasses and coal tar vapors are instantly vaporized through vaporization and destructive distillation and subsequent vaporization. The organic gasses and coal tar vapor then undergo further carbonization and nucleate to form stable and solid microcarbon particles, e.g. carbon black or carbon black-like particles, that exit the vapor phase and are pneumatically conveyed through and out of the work zone. These new particles represent a mass fraction up to 10% to 75% of the initial coal feedstock mass depending on the volatile matter content of the feed coal particles, the temperature at which the process is run, and the residence time in the process. The microcarbon particles have a new morphology, chemical makeup and mineral properties compared to the original coal particles as well as organic gases or coal tars from which they were made Without being bound by theory, upon near-instantaneous vaporization of coal tars when the coal particles are pneumatically conveyed into the oxygen deprived work zone at 1000° C., the coal tar temperature quickly heat up to reach 1000° C. At this high temperature the organic gases and coal tar vapor in the oxygen depleted gas stream begin to carbonize. This means the carbon molecules lose hydrogen, oxygen, nitrogen, sulfur, and any other minor constituents creating molecules of nearly pure carbon that have a graphite-like structure. The layers aggregate together until their molecular mass is such that they cannot exist in the vapor phase. At this point, they exit from the vapor phase as a microcarbon particle The microcarbon particle product has morphology, chemistry, and conductivity traditionally associated with carbon black when produced at temperatures in excess of about 1000° C. When produced at temperatures between about 800° C. and 1000° C., the microcarbon particles produced from the organic gasses and coal tar vapor differ from carbon black in morphology and chemistry.

Figure 3:
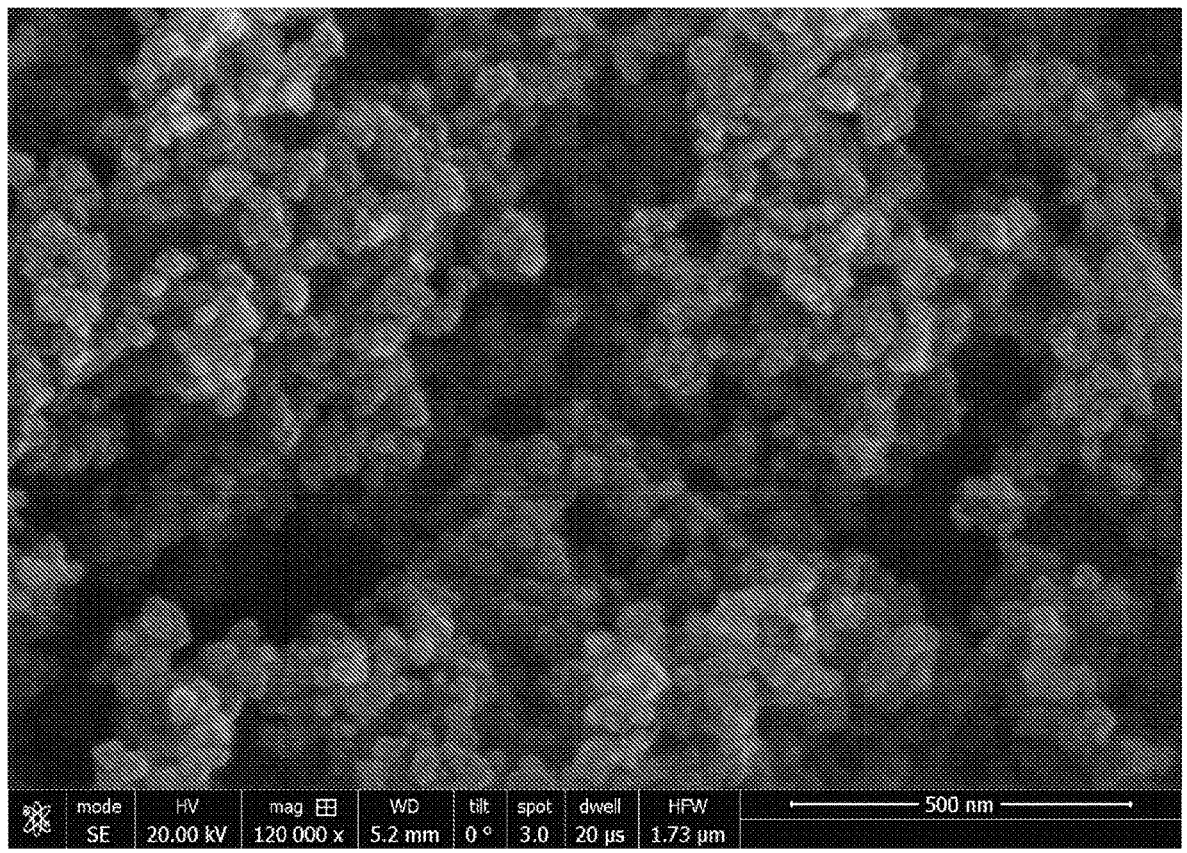
FIG. 3 shows an SEM image of microcarbon particles formed during rapid thermal fracture of the coal particles at about 1200° C. with a residence time of 1 second.

FIG. 3 shows an SEM of microcarbon particles formed in this manner. This particle was made with a work zone temperature of 1200° C. and a residence time of 2 seconds. The spherical structure seen in the SEM is representative of carbon black morphology. These microcarbon particles were conductive. The spheres have a diameter range of about 20 to 44 nm. Volatile matter was about 1.2%. Carbon (C), hydrogen (H), nitrogen (N), sulfur (S), and oxygen (O) (CHNSO) analysis was done with a CHNSO Elemental Analyzer. Oxygen was obtained by difference. CHNSO values are reported on ash-free basis. Oxygen content was about 1.15%. CHNSO data is shown in Table 3. The low CHNSO values and conductivity of the material indicate that carbonization was reaching completion, producing nearly pure carbon. The carbon content of about 96%.

Figure 4A:
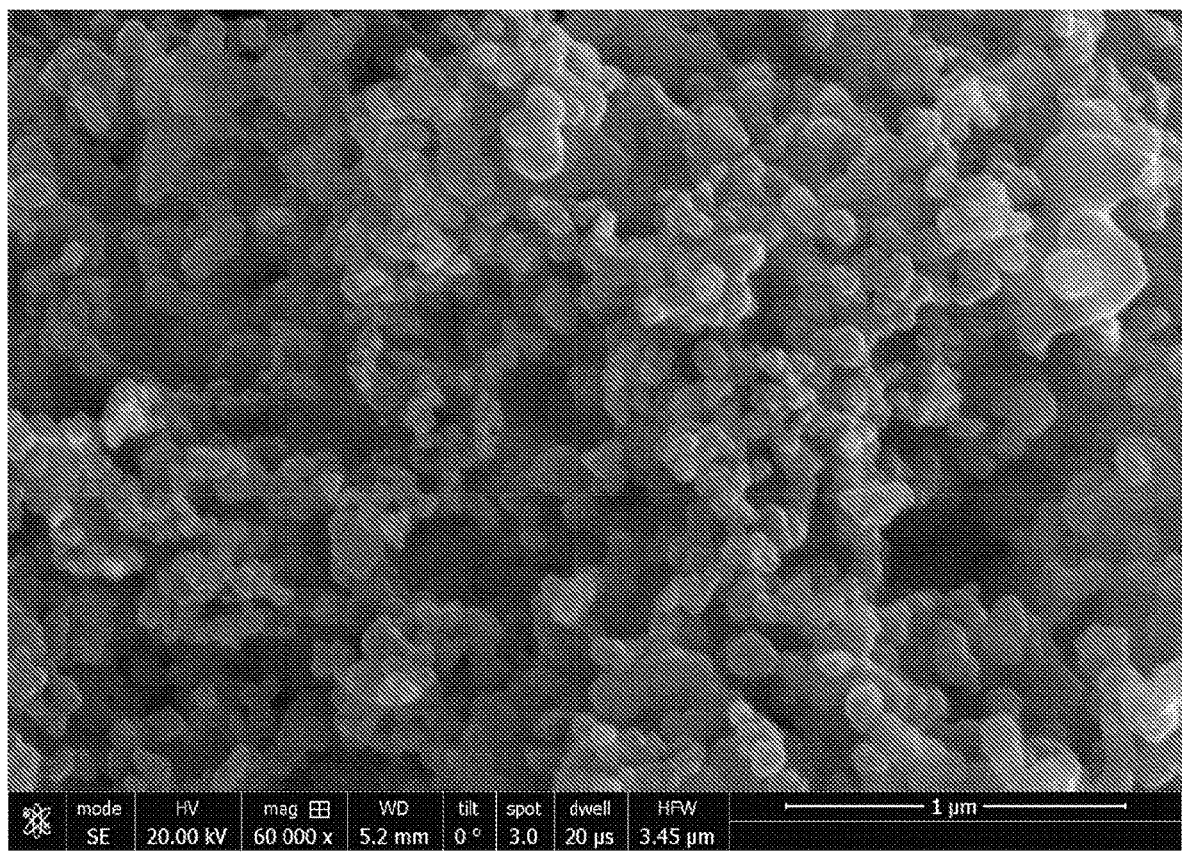
FIG. 4A and FIG. 4B show SEM images of microcarbon particles formed during rapid thermal fracture of the coal particles at about 1000° C. with a residence time of 0.4 seconds.
Figure 4B:
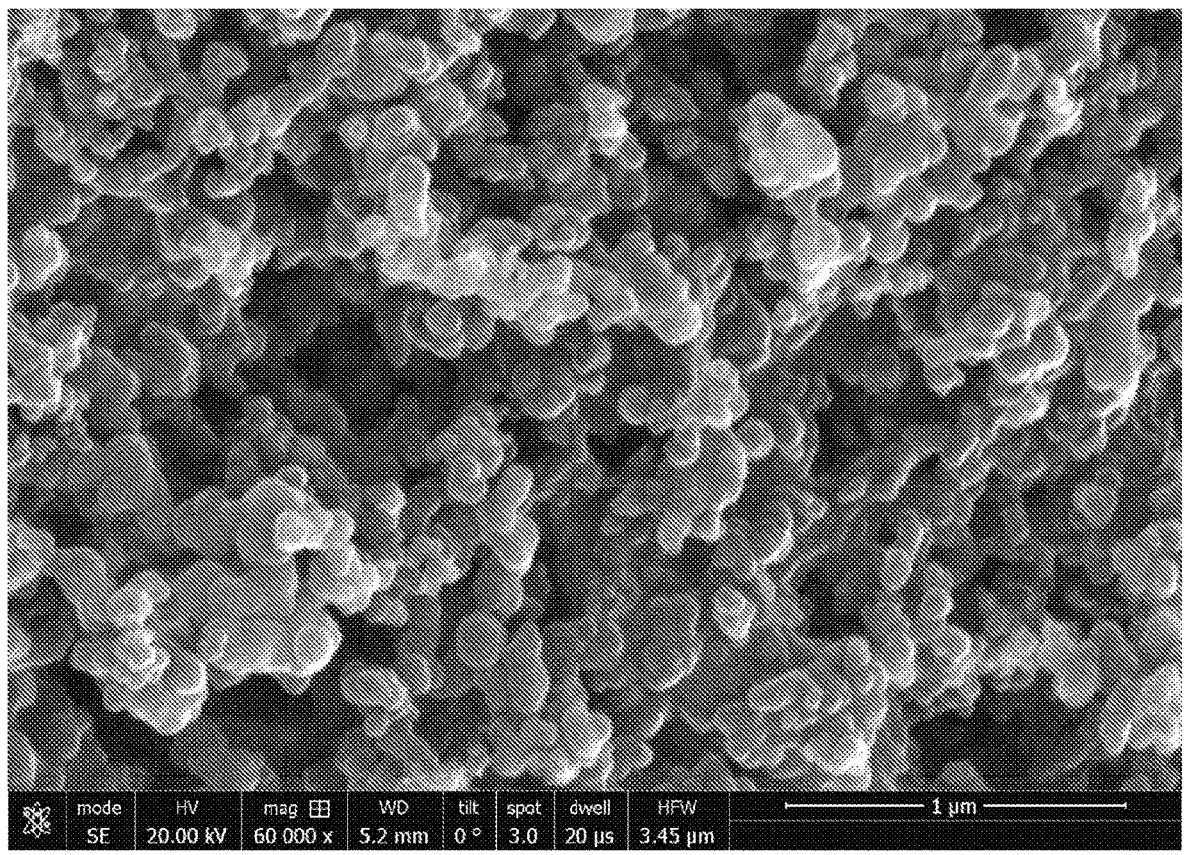

FIGS. 4A and 4B shows SEM images for microcarbon particles produced at about 1000° C. and a residence time of 0.4 seconds. There are flat circular structures along with somewhat larger flat structures. There are also some spherical structures as were observed in FIG. 3. The microcarbon particles in FIGS. 4A and 4B are produced at a temperature between those used to produce the microcarbon particles shown in FIG. 3 and FIG. 5. The microcarbon particles in FIG. 4 appear to be a blend of the two structure sets shown in FIGS. 3 and 5 that were produced at higher and lower operation temperatures respectively. The spheres have a diameter range of about 44 to 90 nm. Volatile matter was about 8.1%. CHNSO data is shown in Table 3. Oxygen content in CHNSO analysis was about 6.4%.

Figure 5:
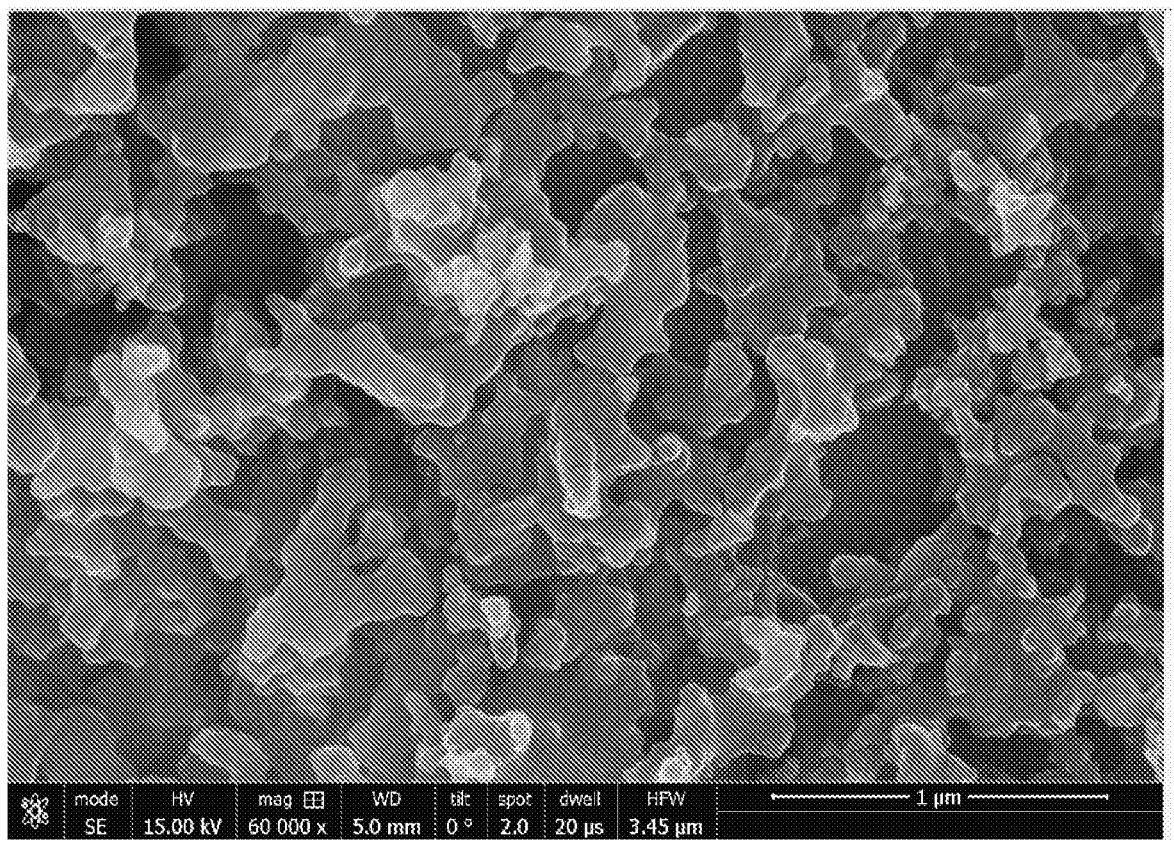
FIG. 5 shows an SEM image of microcarbon particles formed during rapid thermal fracture of the coal particles at about 900° C. with a residence time of 2 seconds.

FIG. 5 shows an SEM image for microcarbon particles produced at about 900° C. and a residence time of 2 seconds. Flat long range structure is observed for this low temperature operation (<1000° C.). The structure dimensions range from about 130 to 550 nm. Volatile matter was about 9.0%. CHNSO data is shown in Table 3. Oxygen content in CHNSO analysis was about 9.4%.

Figure 6:
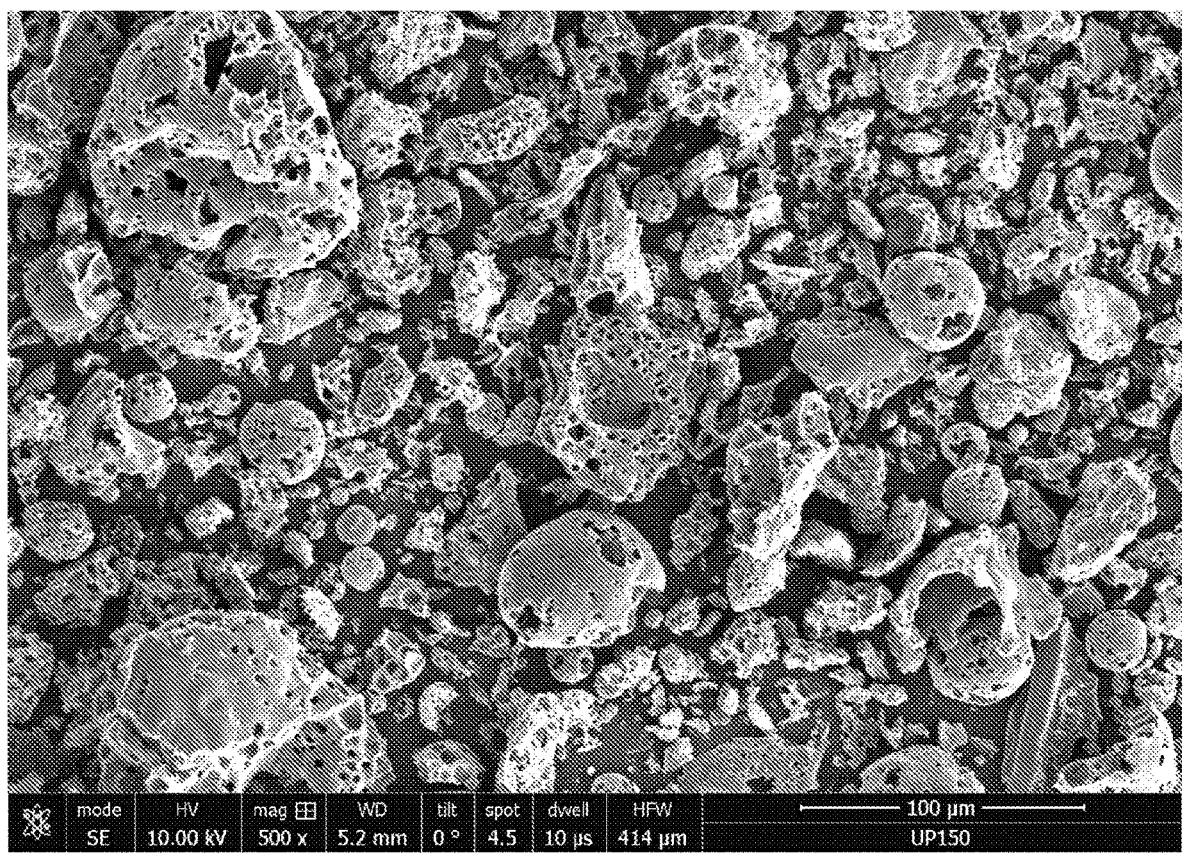
FIG. 6 shows an SEM image of low volatile matter and fractured particles formed during rapid thermal fracture of the coal particles at about 1000° C. with a residence time of 0.4 seconds.

FIG. 6 shows an SEM image for fractured and low volatile matter particles produced at about 1000° C. and a residence time of 0.4 seconds. The fractured structure can be observed. All of the particles appear to be below 100 µm. The particles were conductive. Volatile matter was about 1.8%. CHNSO data is shown in Table 3. Oxygen content in CHNSO analysis was about 1.77%. The low CHNSO values and conductivity of the material indicate that carbonization was reaching completion, producing nearly pure carbon. The carbon content was about 95%.

Figure 7:
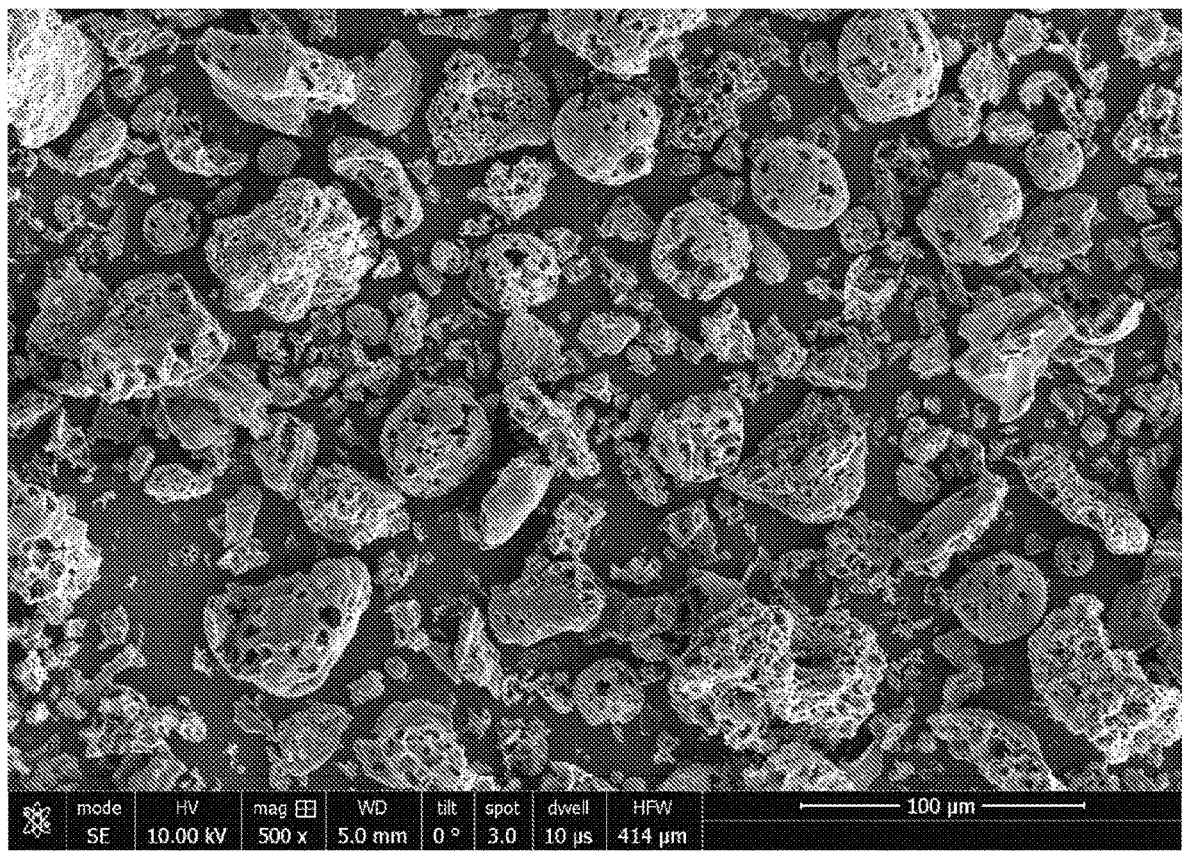
FIG. 7 shows an SEM image of low volatile matter and fractured particles formed during rapid thermal fracture of the coal particles at about 600° C. with a residence time of 0.2 seconds.

FIG. 7 shows an SEM image for fractured and low volatile matter particles produced at about 600° C. and a residence time of 0.2 seconds. The fractured structure can be observed. All of the particles appear to be below 100 µm. Volatile matter was about 8.2%. CHNSO data is shown in Table 3. Oxygen content in CHNSO analysis was about 9.2%.

Figure 8:
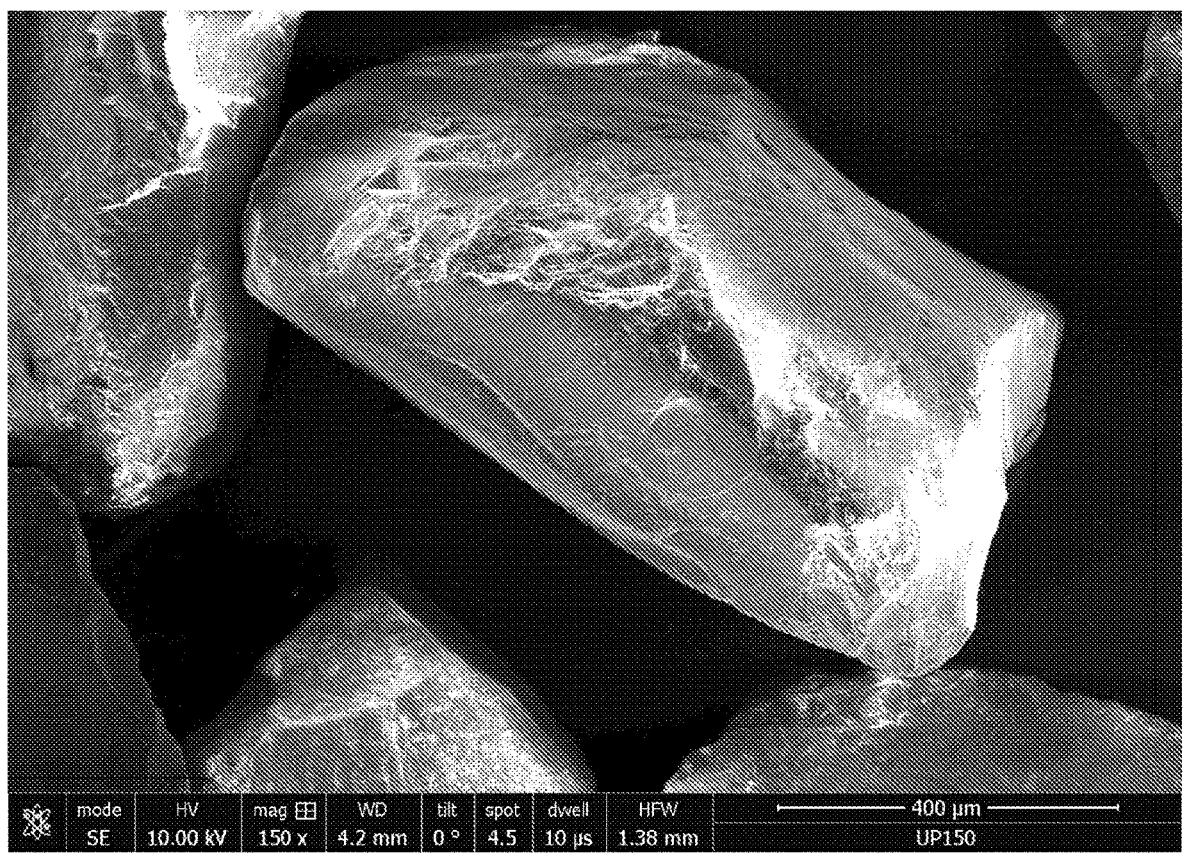
FIG. 8 shows an SEM image of the 1 mm×0.3 mm coal feed particles.
Figure 9:
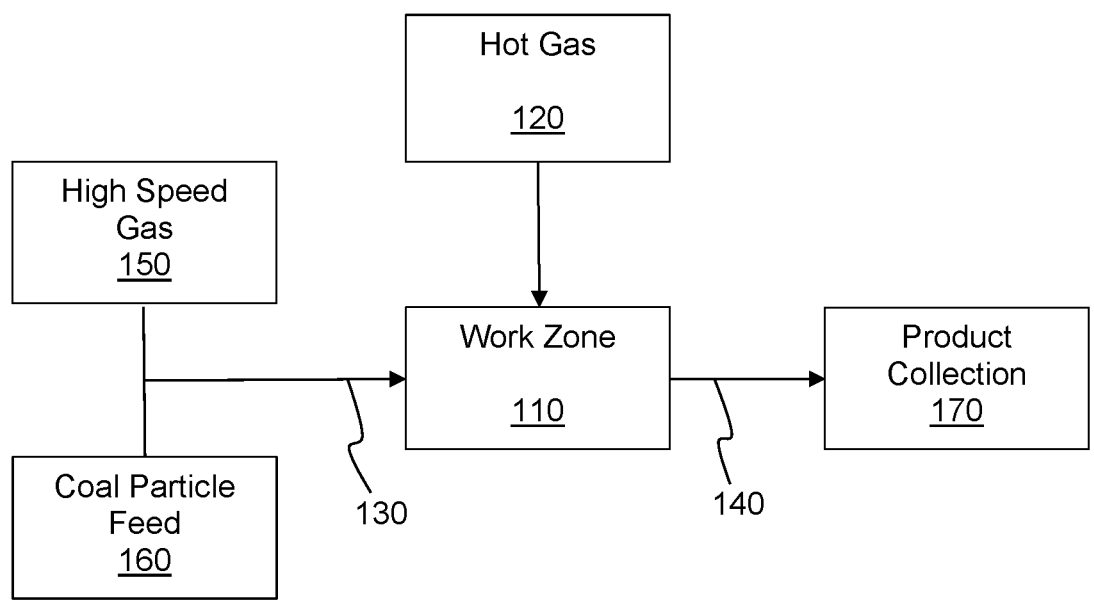
FIGS. 9-13 are block diagrams showing thermal mill and microcarbon separation systems.

FIG. 8 shows an SEM image of the 1 mm×0.3 mm coal feedstock into the thermal fraction and microcarbon separation process. The coal particle feedstock had smooth, flat surfaces without the pore structure seen in the low volatile matter and fractured particles.

Example 6

TABLE 3

| Type of Particle | Temperature when Feed was Started (° C.) | Residence Time (seconds) | Volatile Matter (wt. %) | Conductive | Ash Free Values | | | | |
|---|---|---|---|---|---|---|---|---|---|
| | | | | | C % | H % | N % | O % | S % |
| Microcarbon particles | 1,600 | 0.4 | 1.13% | Yes | 98.91 | 0.11 | 0.08 | 0.62 | 0.28 |
| Microcarbon particles | 1,400 | 0.6 | 1.71% | Yes | 98.42 | 0.18 | 0.12 | 0.87 | 0.41 |
| FIG. 3 Microcarbon particles | 1,200 | 1 | 2.62% | Yes | 97.53 | 0.30 | 0.19 | 1.15 | 0.83 |
| FIG. 4 Microcarbon particles | 1,000 | 1.5 | 8.12% | No | 89.72 | 0.42 | 1.61 | 6.39 | 1.86 |
| FIG. 5 Microcarbon particles | 900 | 2 | 9.03% | No | 86.48 | 1.15 | 1.13 | 9.42 | 1.82 |
| Low volatile matter and fractured particles | 1,600 | 0.4 | 1.52% | Yes | 98.59 | 0.15 | 0.62 | 0.33 | 0.31 |
| Low volatile matter and fractured particles | 1,400 | 0.6 | 1.87% | Yes | 97.50 | 0.21 | 0.94 | 0.63 | 0.72 |
| Low volatile matter and fractured particles | 1,200 | 1 | 3.85% | Yes | 96.32 | 0.36 | 1.32 | 1.03 | 0.97 |
| FIG. 6 Low volatile matter and fractured particles | 1,000 | 1.5 | 5.28% | No | 95.07 | 0.58 | 1.77 | 1.45 | 1.14 |
| FIG. 7 Low volatile matter and fractured particles | 600 | 2 | 8.24% | No | 85.20 | 2.83 | 1.18 | 9.20 | 1.59 |
| FIG. 8 Coal Feed material 1 mm × 0.3 mm | — | — | 33.5% | No | 80.78 | 5.24 | 1.74 | 10.15 | 2.09 |

Table 3 above shows the conductivity and CHNSO characterization results for microcarbon particles and low volatile matter and fractured particles produced from a 1 mm×0.3 mm bituminous coal particles. The characterization of the 1 mm×0.3 mm coal particles are also shown. SEM images of some of the different particles for which data is given in Table 3 are shown in FIG. 3 to FIG. 8. Conductivity was determined by inserting the probes of a multimeter into dry powder of the given particles. If a resistance was measured, then the particles were considered to be conductive. Conductivity is 1/resistivity. Percentages for each element are % by mass.

The microcarbon particles and the low volatile matter and fractured particles produced above 1000° C. had carbon content greater than 95%, low oxygen content (<1.5%) content and were conductive. The microcarbon particles and the low volatile matter and fractured particles produced below 1000° C. had higher oxygen content (5%) content and were not conductive. It would appear that oxygen contents much greater than 1.5% cause the particles to not be conductive. Final carbonization where H, N, O, and S are removed from the molecular organic structure that makes up the particles occurs more rapidly and more completely as temperature increases. The reaction time was not long enough for carbonization to drive off enough oxygen from the carbonaceous matrix for the microcarbon particle or for the low volatile matter and fractured particles produced at 900° C.

Further tests were done where the work zone was 1200° C., 1400° C., and 1600° C. As the temperature in the work zone increased, further carbonization occurred in the same period of time.

At 1200° C. in the work zone, volatile matter a was less than 2.7%, nitrogen was less than 0.2%, sulfur was less than 0.9%, and carbon was greater than 96.5% for the microcarbon particles. At 1200° C. in the work zone, volatile matter was less than 3.9%, nitrogen was less than 1.4%, sulfur was less than 1.0%, and carbon was greater than 96.3% for the low volatile matter and fractured particles.

At 1400° C. in the work zone, volatile matter a was less than 1.8%, nitrogen was less than 0.15%, sulfur was less than 0.5%, and carbon was greater than 98.4% for the microcarbon particles. At 1400° C. in the work zone, volatile matter was less than 1.9%, nitrogen was less than 1.0%, sulfur was less than 0.8%, and carbon was greater than 97.4% for the low volatile matter and fractured particles.

At 1600° C. in the work zone, volatile matter a was less than 1.2%, nitrogen was less than 0.1%, sulfur was less than 0.3%, and carbon was greater than 98.9% for the microcarbon particles. At 1600° C. in the work zone, volatile matter was less than 1.6%, nitrogen was less than 0.7%, sulfur was less than 0.4%, and carbon was greater than 98.5% for the low volatile matter and fractured particles.

Thermal Mill and Microparticle Separator

The disclosed process for the rapid thermal fracturing of coal particles and the rapid devolatilization of volatile matter within coal particles may occur in a thermal mill apparatus, one non-limiting example of which is shown schematically in FIGS. 9, 10, 11, and 12. The thermal mill 100 includes a work zone 110. The work zone 110 has an oxygen-depleted gas heated to a temperature of approximately 600° C. to 2000° C., usually in a range from about 600° C. to 1300° C. A source of high temperature, oxygen-depleted gas 120 is connected to the work zone 110 to provide the work zone with its operating temperature and gas conditions. The work zone has a coal particle inlet 130 and a fractured particle outlet 140.

A source of oxygen depleted high speed gas 150, where high speed means a gas of sufficient velocity and mass flow to convey coal particles introduced into the oxygen depleted gas, entrains and conveys a coal particle feed stream 160 via the coal particle inlet 130 into the work zone 110. The coal particles may have a particle size less than 4 mm. The coal particles are exposed to the high temperature oxygen depleted gas of the work zone for a sufficient time period to cause volatile matter within the coal particles to vaporize and fracture the coal particles, thereby forming fractured coal-derived particles. The coal particles are exposed to the work zone for a time period less than 2 seconds, and often less than 1 second. In currently preferred embodiments, the coal particle residence time is less than 0.4 seconds and less than 0.2 seconds. In another embodiment, the residence time in the work zone is less than 0.6 seconds. The rapid, near instantaneous exposure to the high temperature work zone causes the volatile matter dispersed throughout the coal particles to flash vaporize and to shatter or fracture the coal particle into multiple pieces of fractured particles. The resulting coal particles have a substantially reduced particle size, increased porosity, and decreased volatile matter therein. The fractured particles may have an average particle size less than 200 μm, and often less than 100 μm.

The fractured particles remain entrained within the stream of oxygen depleted high speed gas and are conveyed from the work zone to a product collection system 170 via the fractured particle outlet 140.

One non-limiting example of the product collection system 170 is the cyclone collector described herein.

Figure 10:
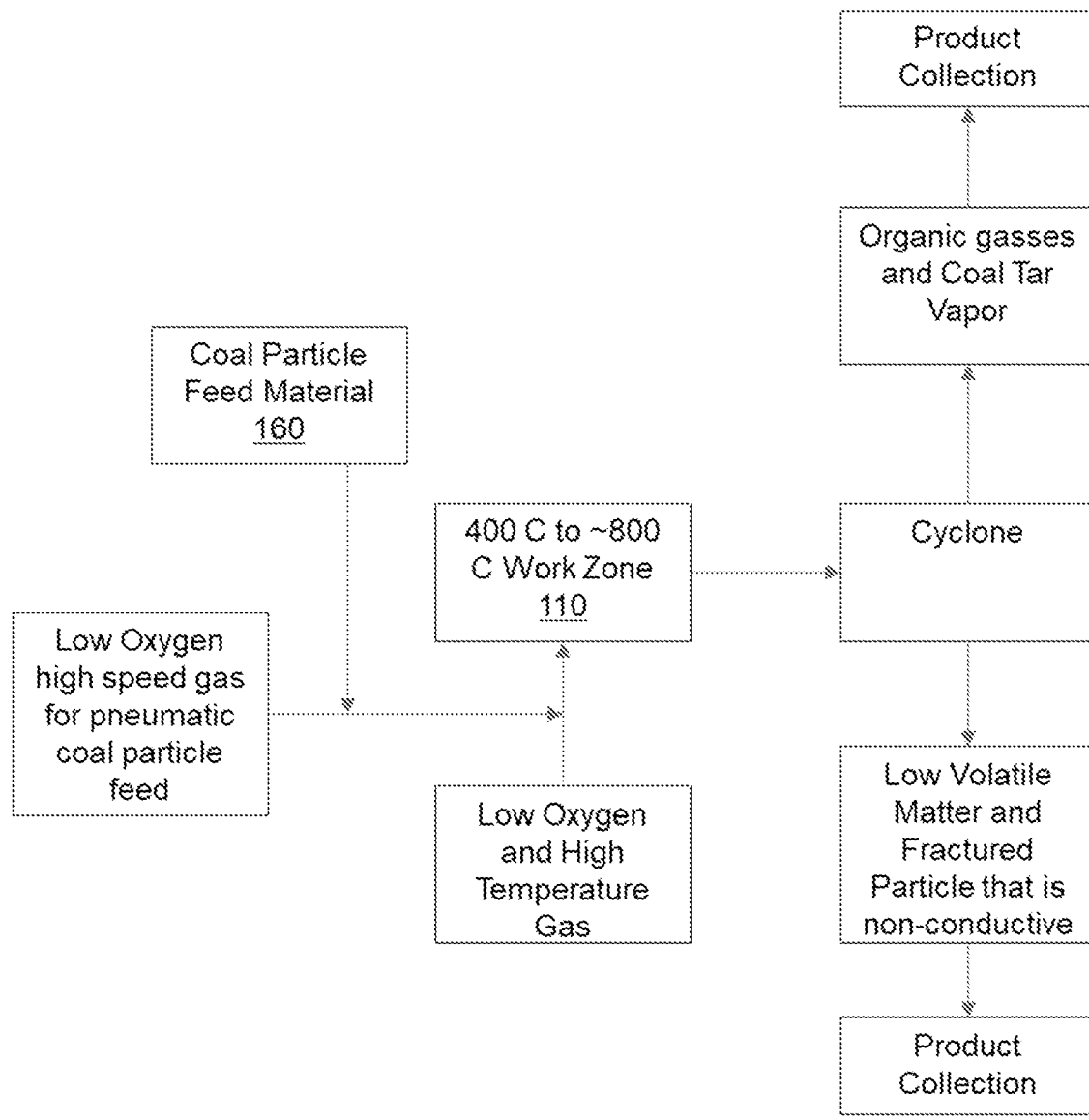

FIG. 10 shows the lower temperature process regime from about 400° C. to 800° C. Higher oxygen content and non-conductive low volatile matter and fractured particles are produced via rapid thermal fracture in the work zone, then exit the underflow of the cyclone to be collected. Coal tar vapor exits the top of the cyclone and is collected, for example in a condenser. Ash content of the coal tar is less than 1%. The low volatile matter and fractured particles had an ash content of about 15% and a volatile matter of ranging from 10% to 16%. Depending on the volatile matter of the coal particles (bituminous, sub-bituminous, lignite, anthracite) about 60% to 80% was of the mass of the coal particles was converted to low volatile matter and fractured particles. About 20% to 40% of the mass of the coal particles was converted to coal tar.

Figure 11:
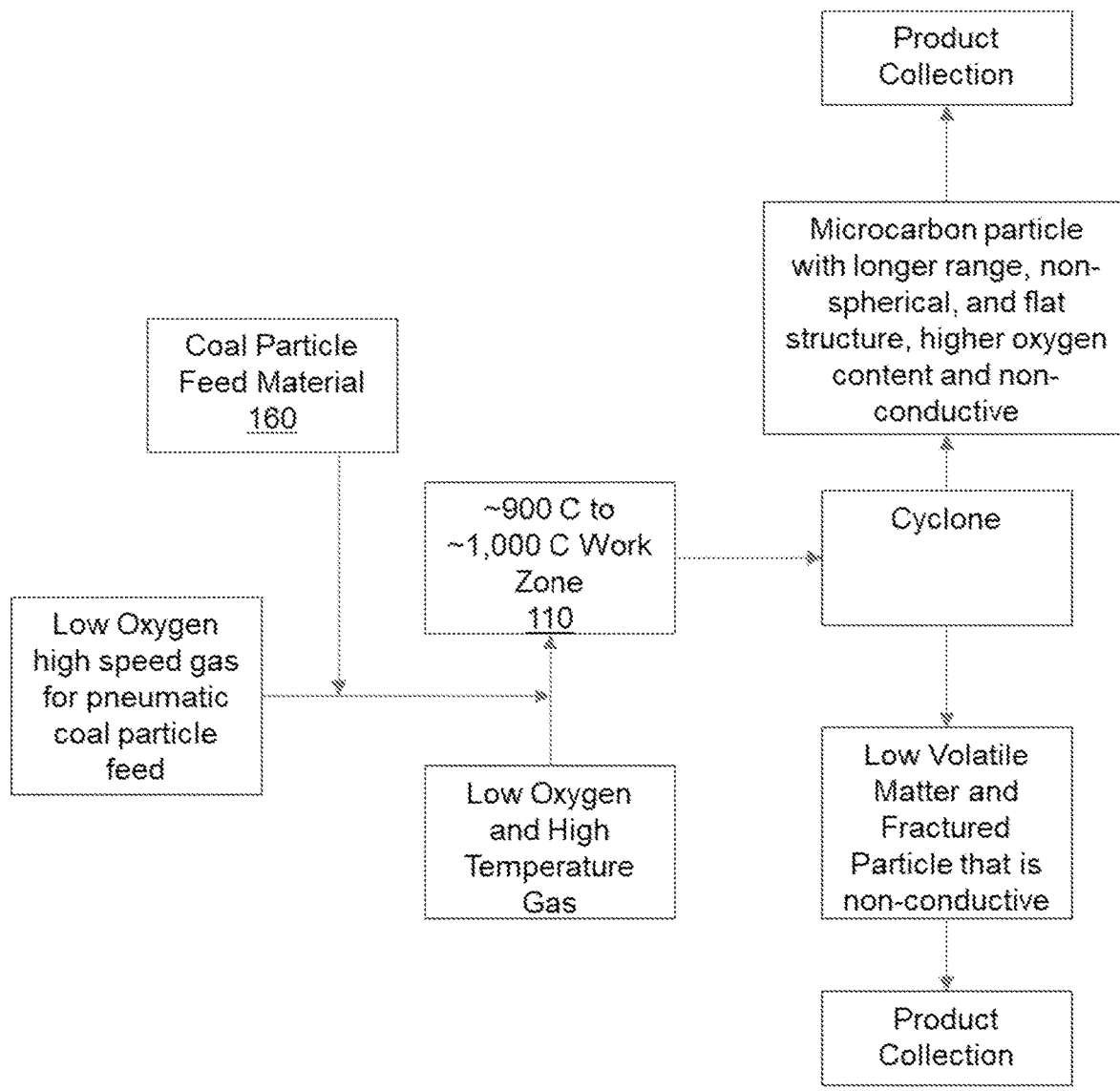

FIG. 11 shows the middle temperature process regime from about 800° C. to about 1000° C. Higher oxygen content and non-conductive low volatile matter and fractured particles are produced via rapid thermal fracture in the work zone, then exit the underflow of the cyclone to be collected. Higher oxygen content and non-conductive microcarbon particles exit the top of the cyclone and are collected, for example in a baghouse. Depending on the volatile matter of the coal particles (bituminous, sub-bituminous, lignite, anthracite), about 55% to 75% of the mass of the coal particles was converted to low volatile matter and fractured particles. About 25% to 45% of the mass of the coal particles were converted to microcarbon particles. Ash content of the microcarbon particle was less than 1%, volatile matter was about 9%, oxygen content was about 9.4%, and the particles were non-conductive. Ash content of the low volatile matter and fractured particles was about 20%, volatile matter was about 9% to 12%, oxygen content was about 6.4%, and the particles were non-conductive.

Figure 12:
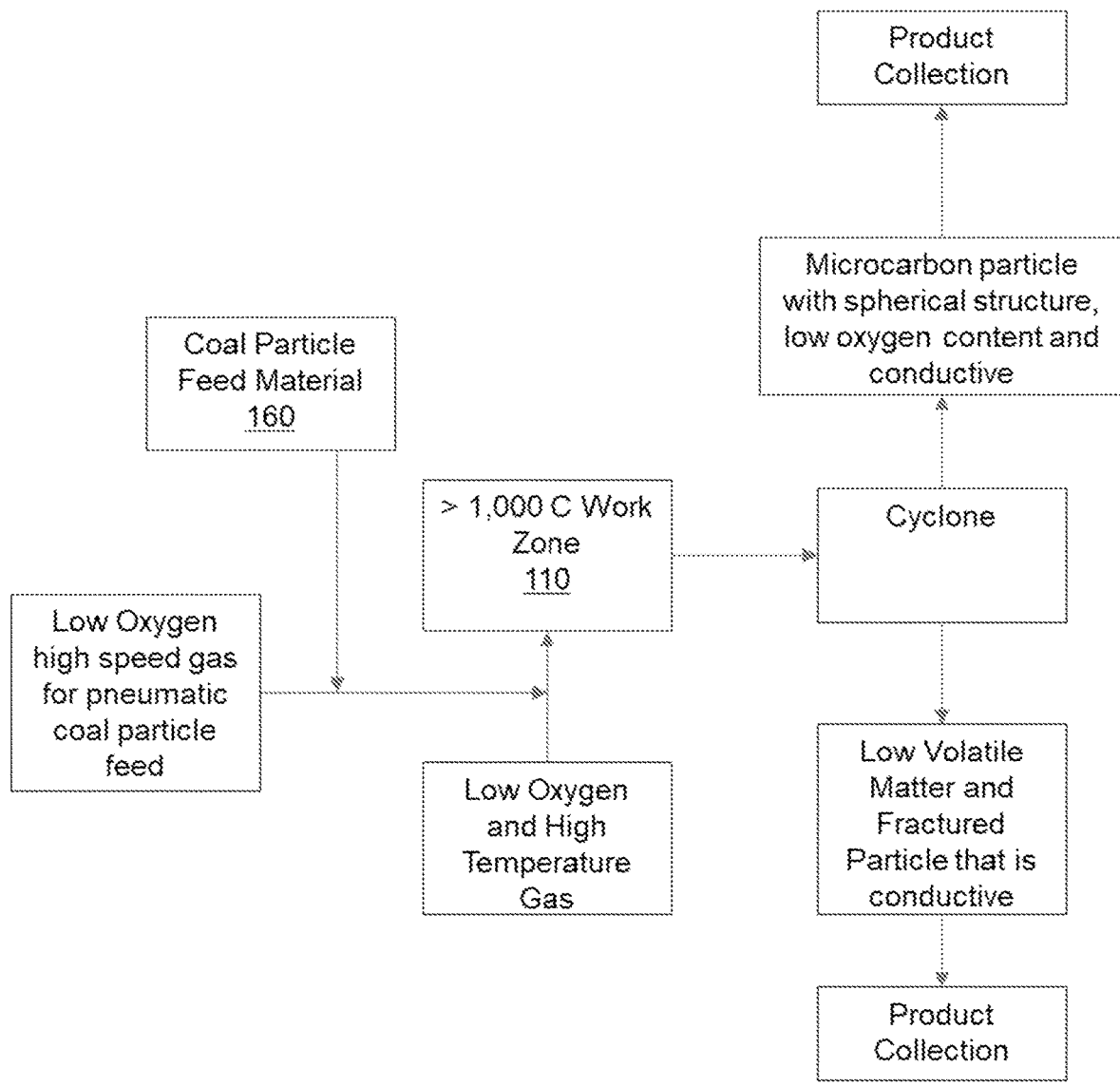

FIG. 12 shows the high temperature process regime with work zone temperatures greater than 1200° C., preferably between about 1200° C. and 1400° C. Temperatures as high as 2000° C. can be used in the work zone. In the work zone, the organic gasses and coal tar vapor produced during thermal fracture immediately undergo further destructive distillation and carbonization to produce microcarbon particles with spherical structure. Depending on temperature and residence time, the spheres can be individual or agglomerated. Often the agglomerates are physically attached spheres to form chains and branched chains of spheres to create longer range structures of the spheres. The individual spheres or connected spheres form longer range structure commonly called carbon black. As temperature increases and residence time decreases, the diameter of the microcarbon spheres decreases. Smaller diameter microcarbon spheres are generally considered of higher value in commercial markets. Lower oxygen content and conductive low volatile matter and fractured particles are produced via rapid thermal fracture in the work zone, then exit the underflow of the cyclone to be collected. Lower oxygen content and conductive microcarbon particles exit the top of the cyclone and are collected, for example in a baghouse. Depending on the volatile matter of the coal particles (bituminous, sub-bituminous, lignite, anthracite), about 45% to 65% of the mass of the coal particles was converted to low volatile matter and fractured particles. About 35% to 65% of the mass of the coal particles were converted to microcarbon particles. Ash content of the microcarbon particle was less than 1%, volatile matter was less than 2%, oxygen content was low, and the particle was conductive. Ash content of the low volatile matter and fractured particles was about 28.5%, volatile was 0.5% to 5% and the particle was conductive.

Another Thermal Mill and Microparticle Separator Design

Figure 13:
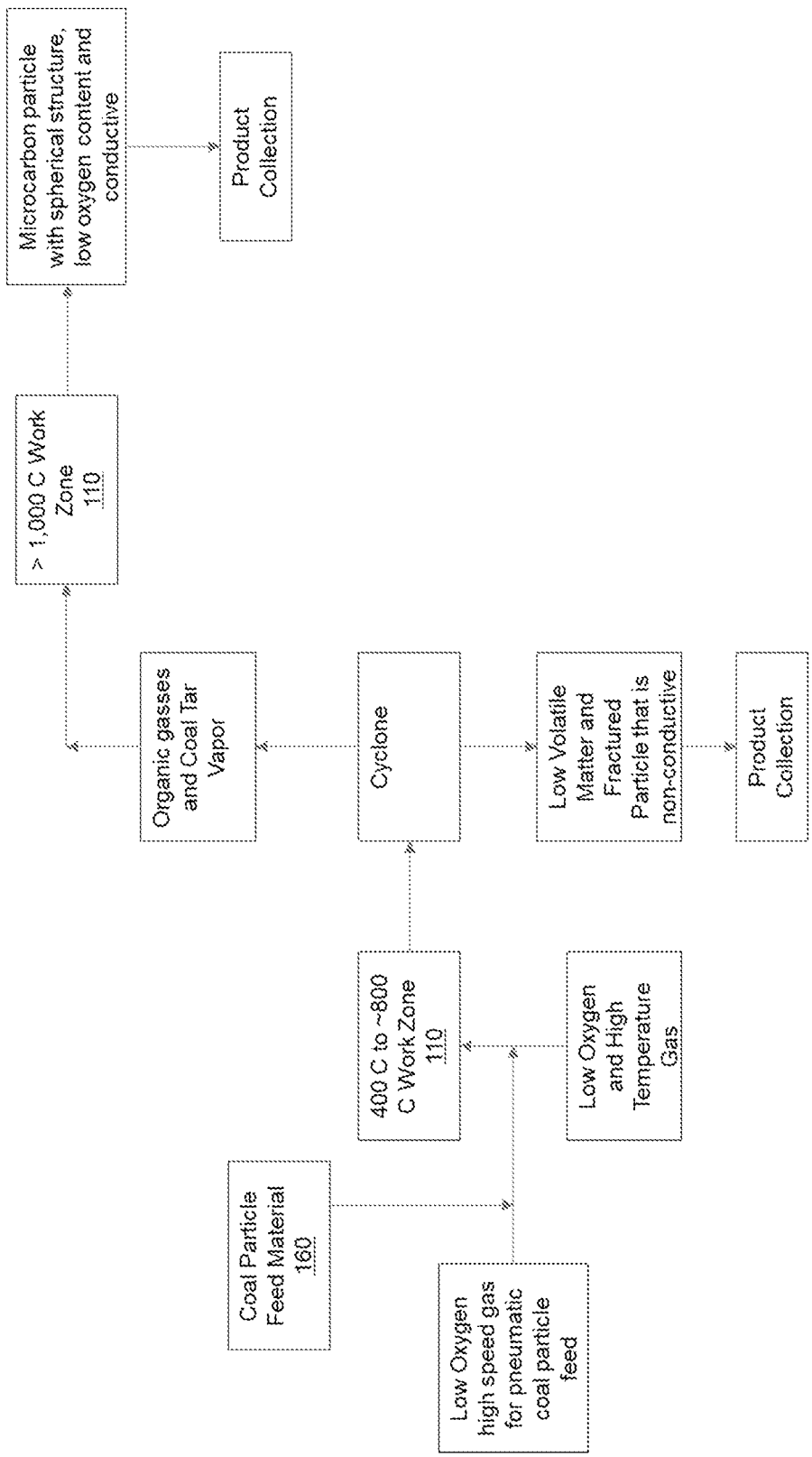

Another embodiment of the thermal mill and microcarbon separation process is shown in FIG. 13. This embodiment has a two work zones set at two different temperatures. The temperature in both zones can be set at any temperature within the preferred temperature range of 600° C. to 2000° C. The preferred embodiment has the first work zone temperature set between 600° C. and 800° C. In another embodiment, the temperature of the first work zone may be set as low as 400° C. Under these conditions, rapid thermal fracture occurs. Approximately 65% to 75% of the coal particles, based on work zone temperature, becomes low volatile matter and fractured particles that are about 20% ash and 9% volatile matter, and about 6 to 10% oxygen. The remainder of the feedstock mass is in the form of organic gasses and coal tar vapor. The organic gasses and coal tar vapor exit the top of the cyclone and enter into the second work zone. The second work zone is set at a temperature greater than 1000° C., preferably between about 1200° C. and 1400° C. Temperatures as high as 2000° C. can be used in the second work zone, however. In the second work zone, the organic gasses and coal tar vapor undergo further destructive distillation and carbonization to produce microcarbon particles with spherical structure. Depending on temperature and residence time, the spheres can be individual or agglomerated. Often the agglomerates are physically attached spheres to form chains and branched chains of spheres to create longer range structures of the spheres. The individual spheres or connected spheres form longer range structure commonly called carbon black. As temperature increases and residence time decreases, the diameter of the microcarbon spheres decreases. Smaller diameter microcarbon spheres are generally considered of higher value in commercial markets. Low volatile matter and fractured particles are produced via rapid thermal fracture in the work zone and exit the bottom of the cyclone and are collected. Microcarbon particles exits the top of the cyclone and are collected, for example in a baghouse.

Example 7

TABLE 4

| Work Zone Temperature (° C.) | Maximum Dimension of Microcarbon Particles (µm) |
|---|---|
| 600 | 1 |
| 800 | 0.5 |
| 1000 | 0.15 |
| 1200 | 0.045 |
| 1400 | 0.025 |
| 1600 | 0.02 |
| 2000 | 0.015 |

Figure 14:
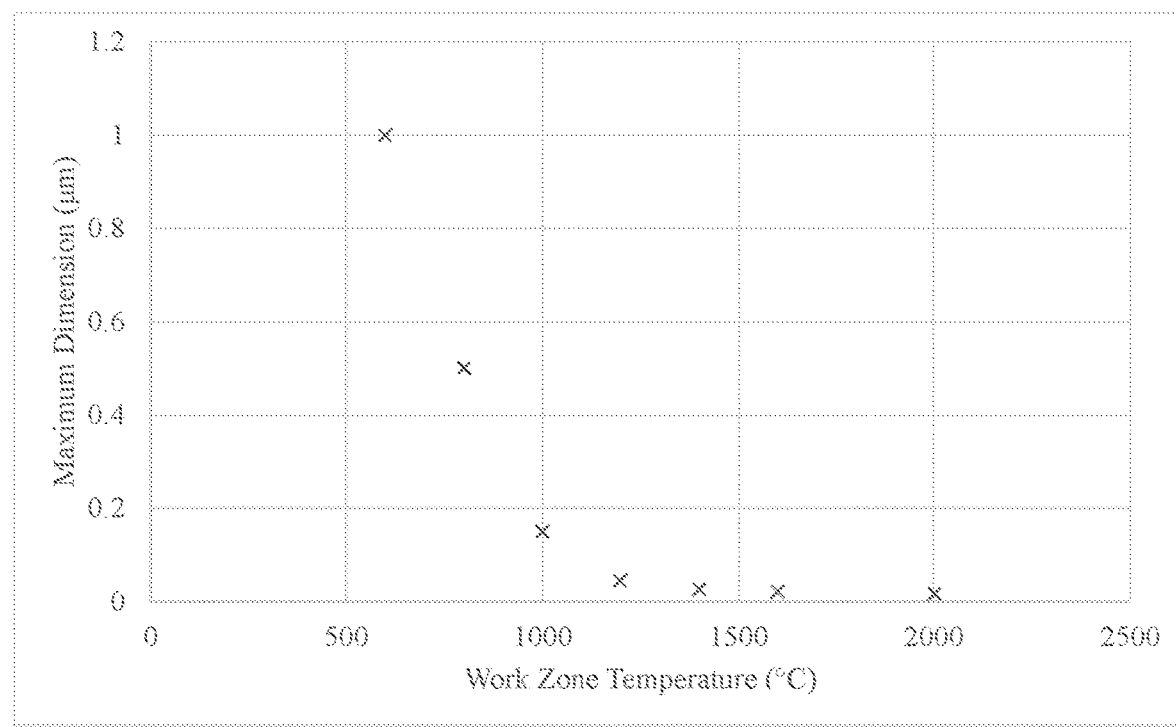
FIG. 14 shows a graph of maximum dimension of microcarbon particles as a function of work zone temperature.

Table 4 above shows the maximum dimension of microcarbon particles as a function of work zone temperature. FIG. 14 shows this data as a graph.

The maximum dimension of microcarbon particles is shown to decrease rapidly as a function of temperature until starting to reach a lower limit at 2000° C. As temperatures exceed about 800° C. to 1000° C., the microcarbon structure is predominantly spherical. Below 800° C. the microcarbon particles have a more long range flat structure. The long dimension can be as large as 1 µm. The shorter dimension may only be about 0.2 µm for a maximum dimension of 1 µm. The data shown in Table 4 and FIG. 14 were collected for microcarbon particles made using 35 wt. % volatile matter bituminous coal as the feed material for the thermal fraction and microcarbon separation process. Microcarbon particles made from feedstocks of lignite, bituminous, sub-bituminous, and anthracite all showed similar particle size trends for the temperature range shown above.

Example 7

TABLE 5

| Work Zone Temperature (° C.) | 0.3 mm to 1 mm Coal Particles | Less than 5 mm Coal Particles | Less than 10 mm Coal Particles |
|---|---|---|---|
| 600 | 350 | 1000 | 2000 |
| 800 | 200 | 260 | 500 |
| 1000 | 75 | 100 | 200 |
| 1200 | 50 | 53 | 55 |
| 1400 | 46 | 48 | 47 |
| 1600 | 43 | 44 | 43 |
| 2000 | 40 | 41 | 42 |

Figure 15:
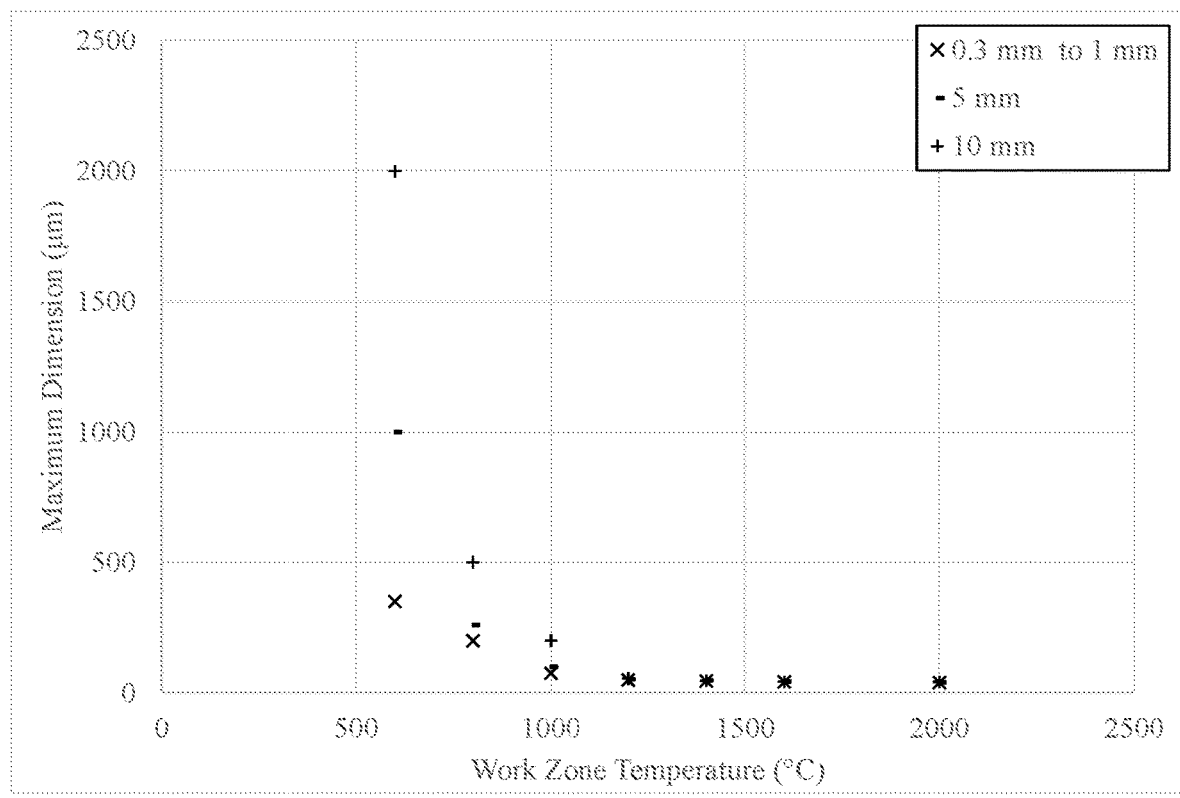
FIG. 15 shows a graph of the average particle size of the low volatile matter and fractured particles as a function of work zone temperature for three different coal particle sizes used as a feed material for the process.

Table 5 shows the average particle size of the low volatile matter and fractured particles as a function of work zone temperature for three different coal particle sizes used as a feed material for the process. FIG. 15 shows this data as a graph.

Different coal particle sizes were used as the feed material for the thermal fracture and microcarbon separation process of coal particles. As seen in Table 5 and FIG. 15, at low work zone temperatures (1000° C. or less) the particles are different sizes. When larger coal particles are used for the process, the fractured particle size is also larger than when smaller particles are used for the process. Once the work zone temperature exceeds 1200° C., then the fractured particle size is about the same for this work zone temperature regardless of the size of the coal particle used for the process. There is also the expected trend of smaller particle size with increasing work zone temperature.

The data shown in Table 5 and FIG. 15 were collected for low volatile matter and thermally fractured particles made using 35 wt. % volatile matter bituminous coal as the feed material for the thermal fraction and microcarbon separation process. Low volatile matter and thermally fractured particles made from feedstocks of lignite, bituminous, sub-bituminous, and anthracite all showed similar particle size trends for the temperature range shown above.

Example 8

TABLE 6

| Work Zone Temperature (° C.) | Bituminous | Sub-bituminous | Lignite |
| --- | --- | --- | --- |
| 600 | 15 | 18 | 20 |
| 800 | 10 | 14 | 15 |
| 1000 | 6 | 7 | 9 |
| 1200 | 3 | 4 | 5 |
| 1400 | 1 | 1.5 | 2 |
| 1600 | 0.7 | 0.8 | 0.9 |
| 2000 | 0.5 | 0.6 | 0.7 |

Figure 16:
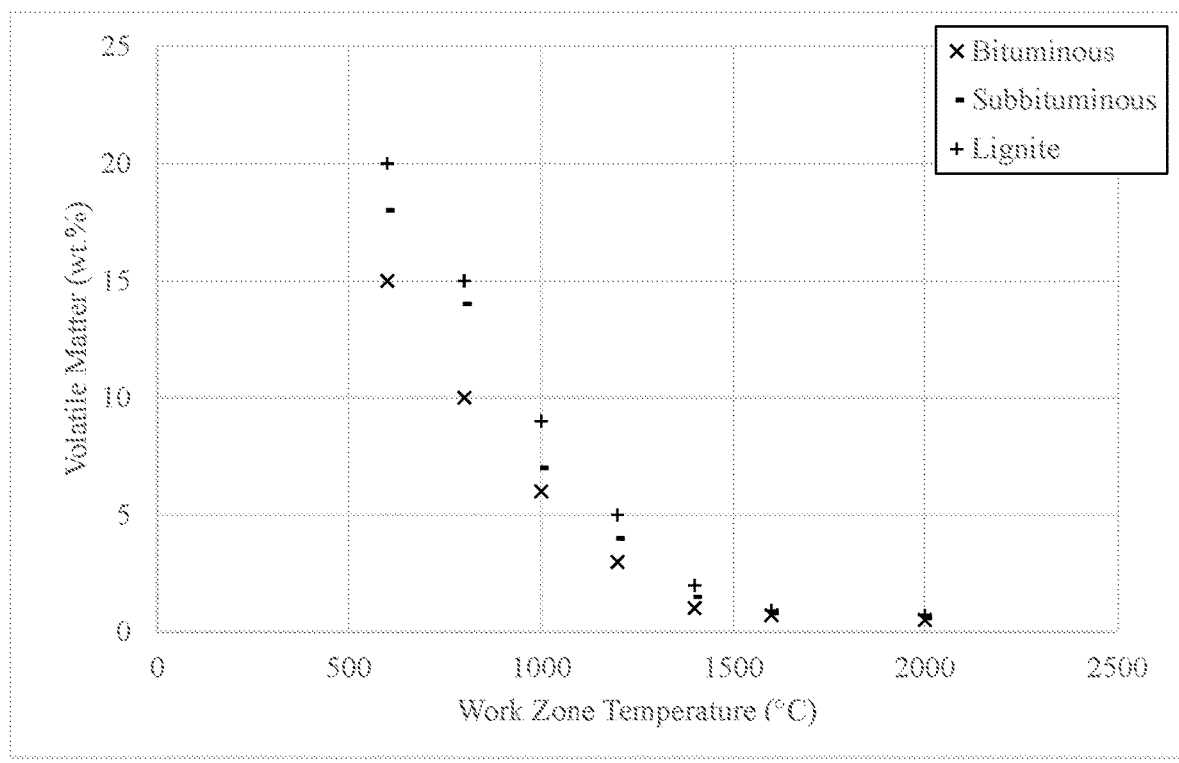
FIG. 16 shows a graph of wt. % volatile matter of low volatile matter and fractured particles as a function of work zone temperature when using bituminous coal, sub-bituminous coal, or lignite coal for the process.

Table 6 shows wt. % volatile matter of low volatile matter and fractured particles as a function of work zone temperature when using bituminous coal, sub-bituminous coal, or lignite coal for the process. FIG. 16 shows this data as a graph.

Three different types of dry coal (<2 wt. % moisture) were used as the feedstock in the thermal fracture and microcarbon separation of coal particles: bituminous coal, sub-bituminous coal, and lignite. All three coals had a particle size between 1 mm and 0.3 mm. Volatile matter was 35 wt. % for the bituminous coal, 45 wt. % for the sub-bituminous coal, and 55 wt. % for the lignite coal.

The low volatile matter and fractured particles have about the same volatile matter across the work zone temperatures tested. The higher volatile matter lignite had the highest volatile matter as expected. At a work zone temperature of about 1200° C. and above, the volatile matter of the low volatile matter and fractured particles is about the same for a given temperature regardless of which coal particle type was used.

Further Discussion

All ranks of coal, e.g. anthracite, bituminous, sub-bituminous, and lignite can be used as a feedstock in the rapid thermal fracture and microcarbon separation process. Anthracite is a higher rank coal with volatile matter usually below 10%. More low volatile matter and fractured particles would be expected at all temperatures compared to other coals. The coal tar or microparticles produced would be less than all other coals. Both sub-bituminous coal and lignite coal have high volatile matter, sometimes reaching as high as 55%. Using these high volatile matter coals as a feedstock to the rapid thermal fracture and microcarbon separation process would produces less low volatile matter and fractured particles than coals with lower volatile matter. The coal tar or microparticles produced would be greater than other coals because of the higher volatile matter in the sub-bituminous or lignite feed coal particles Similar results as discussed for the high volatile matter metallurgical grade met coal for the processes depicted in FIGS. 9, 10, 11, 12, and 13 are expected.

Dry biomass such as waste crop clippings, wood chips, sawdust, manure, sewage, hay, etc. could be used as a feedstock into the rapid thermal fracture and microparticle separation process Similar results as discussed for the high volatile matter metallurgical grade met coal for the processes depicted in FIGS. 9, 10, 11, 12, and 13 are expected.

Waste plastics, waste rubbers, waste polymers, all discarded plastics, rubbers, and polymers, all recyclable plastics, rubbers, and polymers could be used as a dry feedstock into the rapid thermal fracture and microparticle separation process. Similar results as discussed for the high volatile matter metallurgical grade met coal for the processes depicted in FIGS. 9, 10, 11, 12, and 13 are expected.

Summary and Observations

Coal is a low-grade fuel because of impurities. Coal has entrained or entrapped mineral matter impurities. It also has elemental impurities as part of the carbon molecular structure or carbon matrix, in particular sulfur, nitrogen, and oxygen, and hydrogen. Sulfur, nitrogen and oxygen decrease the energy content of the coal.

When subjecting dry coal particles to high temperature thermal treatment (>800° C.) in the absence of oxygen, thermal fracture or thermal shattering occurs upon the production of coal tar vapor from the coal particles, resulting in a 10× size reduction without the mechanical costs and challenges of conventional milling and comminution.

Reducing particle size at very high temperature (>1200° C.), coal particles are shattered, destructive distillation produces coal tar vapors and organic gases. Carbonization occurs such that N, S, O are removed from the carbon matrix of the low volatile matter and fractured particles. Coal tar vapor and organic gases are instantly carbonized to reform solid microcarbon particles. Both the low volatile matter and fractured particles and the microcarbon particles are coal-derived, yet they are no longer coal. The low volatile matter and fractured particles are >10X smaller than the feedstock coal particles, are very porous because of the loss of volatile matter in the shattering process, and have different CHNSO than the original coal particles and are usually conductive. The microcarbon particles are usually less than 1 micron in diameter, do not have a size or shape similar to coal at all, have no entrained mineral matter, have different CHNSO content than the original coal particles, and are usually conductive. Coal is never conductive. Also, these two solid coal derived particles are produced nearly instantaneously at the same time in the same high temperature work zone.

Coal is an unstable material. It has a complex molecular structure consisting of linked macromolecules. Upon heating above about 200° C. to 250° C., coal tar vapor is produced because bonds are broken creating smaller molecules that vaporize at these temperatures. As the temperature exceeds 250° C. up to about 700° C., bond breaking produces coal vapor. Above about 700° C., little coal tar is produced. Instead, sulfur, nitrogen, hydrogen, and oxygen are lost from the molecular structure or carbon matrix until only pure carbon is left. Small organic gases such as methane, ethane, and propane may also be produced at temperatures greater than about 700° C. to 900° C. The processes of losing organic gases and S, N, H, and O at higher temperatures until pure carbon remains is called carbonization. Generally, pure carbon can be produced at temperatures above about 1000° C. A carbon material that has been exposed to temperatures greater than about 700° C. to 800° C. where the volatile matter content is less than 10% and the carbon content is greater than 90% is stable for a wide range of temperatures. One meaning of stable is that coal tar vapor no longer evolves from the carbon material at high temperatures.

There are two main ways coal is used, both of which are at high temperature. (1) coal is burned or exposed to heat in the presence of oxygen to produce heat. The flame temperature is around 1900° C. The first thing that happens during burning is that new coal particles are heated by already burned and burning coal particles. Coal tar vapor is produced as the coal heats up above about 250° C. The coal tar vapor interacts with oxygen in the vapor phase and burns from the vapor phase. The leftover mass that did not enter into the vapor phase is still a solid. The solid coal interacts with oxygen and burns until gone. It takes a longer period of time for complete burnout or consumption of the solid than the vapor. Boilers and burners must be designed to ensure both the vapor and solid are completely burned. There is not a standard burner design because coal doesn't have a standard response to high temperature processing. (2) Coal is heated in the absence of oxygen to produce coke. Coke furnaces slowly increase in temperature from ambient temperature to about 1000° C. Upon heating the coal, coal tar vapor is produced as temperatures exceed 200° C. to 250° C. Since there is no oxygen, the coal tar vapor exits the furnace unburned. The solid that remains cross-links into a stable, porous bulk solid with high carbon content, forming the material known as coke. After exiting the coking furnace, the coal tar vapor may be burned or condensed and collected.

Coal is unstable when heated to temperatures above 250° C. to 300° C. whether in the presence or absence of oxygen. Above 250° C. to 300° C., coal tar vapor and organic gases are emitted or produced.

Coal does not have a consistent response across all temperature ranges. The result of the variable response of coal to different temperatures is that a standard high temperature process/equipment cannot be developed for all coal. Instead, the process and equipment must be tuned to the coal used. Furthermore, sulfur, nitrogen, and oxygen are a part of the molecular structure of coal. These elements are undesirable or not advantageous in most uses of coal. There does not exist a process that economically stabilizes coal across a broad temperature range that also reduces and removes sulfur, nitrogen, and oxygen.

We demonstrate a process that can use any coal with a variable response to high temperature thermal treatment in the presence or absence of oxygen and stabilize it into two different coal-derived solid particles that are thermally stable. In this disclosure, the larger coal derived particles have been called low volatile matter and fractured particles. In this disclosure, the smaller coal derived particles have been called microcarbon particles.

Potential uses for the low volatile matter and fractured particles include high carbon content pulverized coal injection (PCI) material, stabilized fuel for coal fired power plant, mass produced activated carbon for water filtration, and mass produced activated carbon soil additive to enhance ion holding capacity and therefore fertility of soil.

Potential used for microcarbon particles include high carbon content material as part of a PCI blend, filler and strengthener for plastics and rubbers, fuel for clean burning distributive microturbines, and mass produced material for battery electrodes.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A process for fracturing and devolatilizing coal particles comprising exposing coal particles to a high temperature, oxygen-depleted work zone for a time period less than 2 seconds to cause volatile matter within the coal particles to vaporize and exit the coal particles, to fracture the coal particles and produce coal-derived low volatile matter and fractured particles, and to produce coal-derived microcarbon particles, wherein the work zone has a temperature in the range from 1000° C. to 2000° C., wherein the high temperature, oxygen-depleted work zone contains less than 1.5% oxygen.

2. The process for fracturing and devolatilizing coal particles according to claim 1, wherein the coal particles are unprocessed and have a given particle size, volatile matter content, sulfur content, and nitrogen content on an ash-free basis, and wherein the coal-derived low volatile matter and fractured particles are characterized by a reduction of one or more of particle size, volatile matter content, sulfur content, and nitrogen content on an ash-free basis compared to the unprocessed coal particles.

3. The process for fracturing and devolatilizing coal particles according to claim 1, wherein the coal particles are unprocessed and have a given carbon content on an ash-free basis, and wherein the coal-derived low volatile matter and fractured particles are characterized by an increase in carbon content on an ash-free basis compared to the unprocessed coal particles.

4. The process for fracturing and devolatilizing coal particles according to claim 1, wherein the coal-derived low volatile matter and fractured particles have a sulfur content less than 50% of the sulfur content of the unprocessed coal particles on an ash-free basis.

5. The process for fracturing and devolatilizing coal particles according to claim 1, wherein the coal-derived low volatile matter and fractured particles have a volatile matter content less than 10% by weight.

6. The process for fracturing coal particles according to claim 1, wherein the coal-derived low volatile matter and fractured particles have an average particle size less than 50% of the average particle size of the unprocessed coal particles.

7. The process for fracturing and devolatilizing coal particles according to claim 1, wherein the coal-derived low volatile matter and fractured particles have a reduced diameter compared to the unprocessed coal particles, a volatile matter content less than 10% by weight, a carbon content greater than 90% by weight on an ash-free basis, a sulfur content less than 1% by weight on an ash-free basis, and a nitrogen content less than 1.5% by weight on an ash-free basis.

8. The process for fracturing and devolatilizing coal particles according to claim 1, wherein the high temperature, oxygen-depleted work zone is obtained from combustion gas exiting a pulse combustor or pulse jet engine.

9. The process for fracturing and devolatilizing coal particles according to claim 1, wherein the coal-derived microcarbon particles have a diameter less than 1 mm, a volatile matter content less than 10% by weight, a carbon content greater than 90% by weight, a sulfur content less than 1% by weight, a nitrogen content less than 1% by weight, and an ash content less than 1% by weight.

10. The process for fracturing and devolatilizing coal particles according to claim 9, wherein the coal-derived microcarbon particles are electrically conductive.

11. The process for fracturing and devolatilizing coal particles according to claim 1, wherein the coal particles are exposed to the high temperature, oxygen-depleted work zone for a time period less than 1 seconds.

12. The process for fracturing and devolatilizing coal particles according to claim 1, wherein the coal particles have a particle size less than 10 mm.

13. The process for fracturing and devolatilizing coal particles according to claim 1, wherein the high temperature, oxygen-depleted work zone contains less than 1.0% oxygen.

14. The process for fracturing and devolatilizing coal particles according to claim 1, wherein the high temperature, oxygen-depleted work zone contains less than 0.5% oxygen.

* * * * *